United States Patent
Tonegawa

[11] Patent Number: 5,905,783
[45] Date of Patent: May 18, 1999

[54] DATA COMMUNICATION APPARATUS AND METHOD

[75] Inventor: Nobuyuki Tonegawa, Kawasaki, Japan

[73] Assignee: Canon Kabushiki Kaisha, Tokyo, Japan

[21] Appl. No.: 08/822,499

[22] Filed: Mar. 24, 1997

[30] Foreign Application Priority Data

Mar. 25, 1996 [JP] Japan .................................. 8-092987
Mar. 21, 1997 [JP] Japan .................................. 9-085522

[51] Int. Cl.⁶ .................................................. H04M 11/00
[52] U.S. Cl. ............................. 379/100.07; 379/100.08; 379/100.01; 358/400
[58] Field of Search .......................... 379/93.05, 93.06, 379/93.07, 93.24, 93.01, 100.08, 100.12, 100.13, 102.02, 100.05, 100.01, 100.07; 358/400, 402, 403, 444, 468

[56] References Cited

U.S. PATENT DOCUMENTS

| | | | |
|---|---|---|---|
| 4,893,333 | 1/1990 | Baran et al. | 379/100.07 |
| 5,383,029 | 1/1995 | Kojima | 358/403 |
| 5,455,686 | 10/1995 | Nagano et al. | 358/468 |
| 5,461,488 | 10/1995 | Witek | 358/444 |
| 5,515,175 | 5/1996 | Okada et al. | 358/402 |
| 5,729,791 | 3/1998 | Kutsuwada et al. | 358/400 |
| 5,764,368 | 6/1998 | Shibaki et al. | 358/403 |

*Primary Examiner*—Paul Loomis
*Assistant Examiner*—Melur Ramakrishnaiah
*Attorney, Agent, or Firm*—Fitzpatrick, Cella, Harper & Scinto

[57] ABSTRACT

There is provided a data communication apparatus comprising a reception means for receiving data via a public network, a reception data storage means for storing the data received by the reception means, into a storage medium, a search sheet output means for outputting a search sheet used to search the data stored by the reception data storage means, an input means for inputting the search sheet output by the search sheet output means and an output means for searching and outputting the data which has been stored in the storage medium by said reception data storage means, in response to the input of the search sheet by the input means. Therefore, the data which has been received from a facsimile apparatus or an electronic mail transmission apparatus is subjected to so-called filing, such that the data can be stored for the later search.

12 Claims, 19 Drawing Sheets

FIG. 5

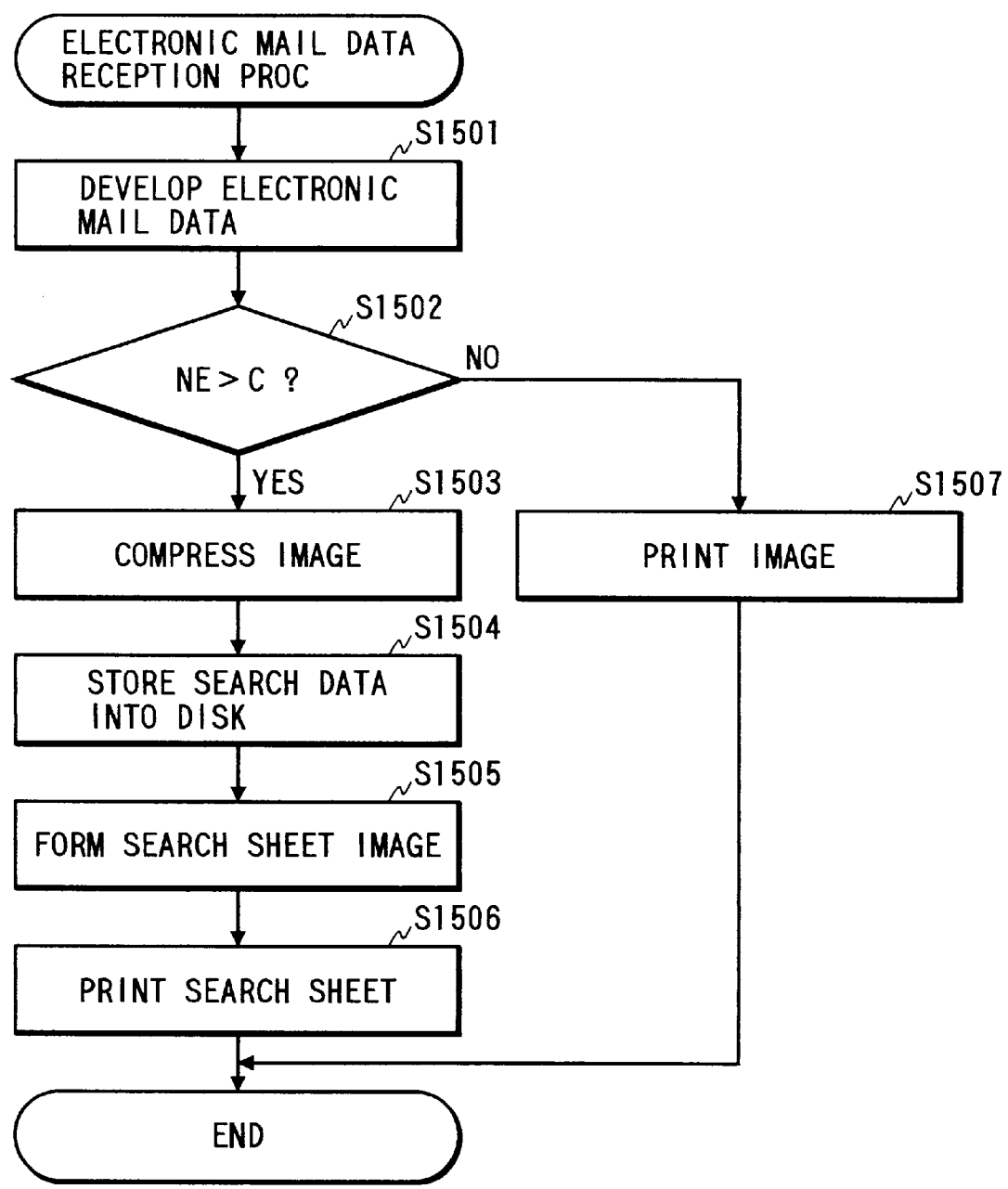

DATA COMMUNICATION APPARATUS AND METHOD

BACKGROUND OF THE INVENTION

1. Field of the Invention

The present invention relates to a data communication apparatus which can perform data communication via a public line or the like, and a data communication method which uses such the data communication apparatus.

2. Related Background Art

Conventionally, there has been widely known a facsimile apparatus as an equipment capable of receiving data via a public line.

Ordinarily, the facsimile apparatus receives image data representing an image, and outputs or prints all the received image data on a recording paper or sheet as visible images. Further, there has been known the facsimile apparatus which has a so-called memory substitute (or proxy) reception function in which the received image data are temporarily stored in a memory if there is no recording paper in the apparatus. Furthermore, there has been known the facsimile apparatus in which, even if the paper remains, memory reception has been previously set to store the received image data in the memory without outputting it on the recording paper.

However, e.g., in case of a long-time vacation, a total amount of the received data becomes remarkably large and thus consumption of the recording paper becomes large. In such a state, if the above-described memory substitute reception function is utilized, when the recording paper becomes empty, the received data is stored in the memory. However, such the stored data are not output or printed, whereby there is some fear that an operator does not find that the data has been received. Further, it is difficult to immediately know a receiver (i.e., destination) and contents of such the data. Furthermore, if the recording paper becomes empty, the large amount of the data have been stored in the memory. Therefore, even if the receiver of the data can be known, all the data stored in the memory must be output or printed to obtain target or objective data, whereby an operation becomes remarkably complicated.

On the other hand, even if all the data stored in the memory are not output or printed, only the image data concerning specific reception can be output by inputting a management number or the like. However, even in this case, there is some fear that the output data does not always correspond to the image data necessary for the receiver. For example, if the management number was erroneously input, unnecessary image data is output or printed.

SUMMARY OF THE INVENTION

An object of the present invention is to provide data communication apparatus and method which eliminate the above-described problems.

An another object of the present invention is to provide the data communication apparatus and method which can clearly notify a receiver that data have been received, even if all the received data are not output.

Still another object of the present invention is to provide the data communication apparatus and method which can reduce wasteful output of the received data.

Still another object of the present invention is to provide the data communication apparatus and method which can easily output the received data at timing desired by the receiver.

Still another object of the present invention is to provide the data communication apparatus and method which can cause a desired output unit to output the received data.

The above and other objects of the present invention will become apparent from the following detailed description when read in conjunction with the accompanying drawings.

BRIEF DESCRIPTION OF THE DRAWINGS

FIG. 5 is a view showing an example of a search sheet which is formed by a file unit in the copy machine according to the first embodiment;

FIG. 15 is a flow chart showing the procedure of an electronic mail data reception process in the copy machine according to the fourth embodiment of the present invention;

DETAILED DESCRIPTION OF PREFERRED EMBODIMENTS

Hereinafter, embodiments of the present invention will be explained in detail with reference to the accompanying drawings.

First Embodiment

Figure 1:
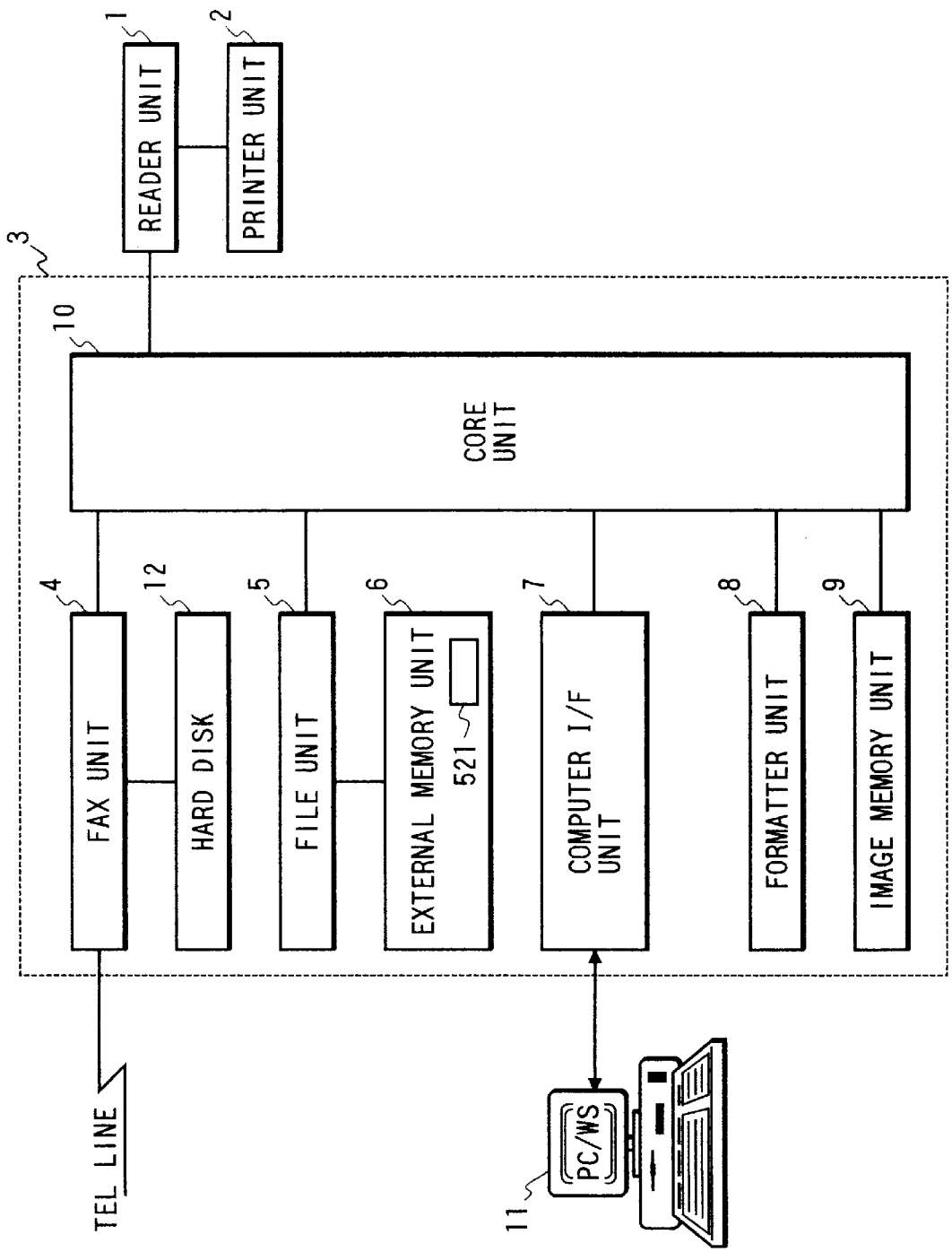
FIG. 1 is a block diagram showing the entire structure of a copy machine according to a first embodiment of the present invention.

FIG. 1 is a block diagram showing the entire structure of an image process apparatus (or facsimile apparatus) according to the first embodiment. In FIG. 1, reference numeral 1 denotes a reader unit which reads an image of an original, and outputs image data obtained by the image reading to a printer unit 2 and an image input/output control unit 3 both connected to the reader unit 1.

The printer unit 2 records, on a recording paper or sheet (not shown), an image according to the image data from the reader unit 1 and the image input/output control unit 3. The image input/output control unit 3 which is connected to the reader unit 1 is composed of a facsimile unit 4, a file unit 5, an external memory unit 6, a computer interface unit 7, a formatter unit 8, an image memory unit 9, a core unit 10, a hard disk 12 and the like. The external memory unit 6 is further composed of an optomagnetic disk drive unit or the like.

The core unit 10 is connected with the facsimile unit 4, the file unit 5, the computer interface unit 7, the formatter unit 8 and the image memory unit 9, and controls data flows among these elements.

The facsimile unit 4 expands compression image data which has been received from an external apparatus such as a facsimile apparatus or the like via a telephone line (e.g., PSTN (public switched telephone network) or the like), and transfers obtained expansion image data to the core unit 10. On the other hand, the facsimile unit 4 compresses the image data transferred from the core unit 10, and transmits the obtained compression image data to the external apparatus via the telephone line. The hard disk 12 is connected to the facsimile unit 4 such that the received compression image data can be temporarily stored in the hard disk 12.

The file unit 5 is connected with the external memory unit 6. The file unit 5 compresses the image data transferred from the core unit 10, and then stores the obtained compression image data into a detachable optomagnetic disk 521 which has been set in the external memory unit 6 connected to the file unit 5, together with a keyword to be used for searching such the compression image data. Further, the file unit 5 searches the compression image data stored in the optomagnetic disk 521 on the basis of the keyword transferred via the core unit 10, reads and expands the searched compression image data, and then transfers the obtained expansion image data to the core unit 10.

The computer interface unit 7 acts as an interface between the core unit 10 and the external apparatus. Such the external apparatus is represented as a PC/WS 11 which includes an electronic mail transmission apparatus, a personal computer, a word station or the like. The formatter unit 8 develops an electronic mail transferred from the PC/WS 11 and code data representing the image, into the image data which can be recorded as visible images by the printer unit 2. Further, the image memory unit 9 temporarily stores the data transferred from the PC/WS 11.

Figure 2:
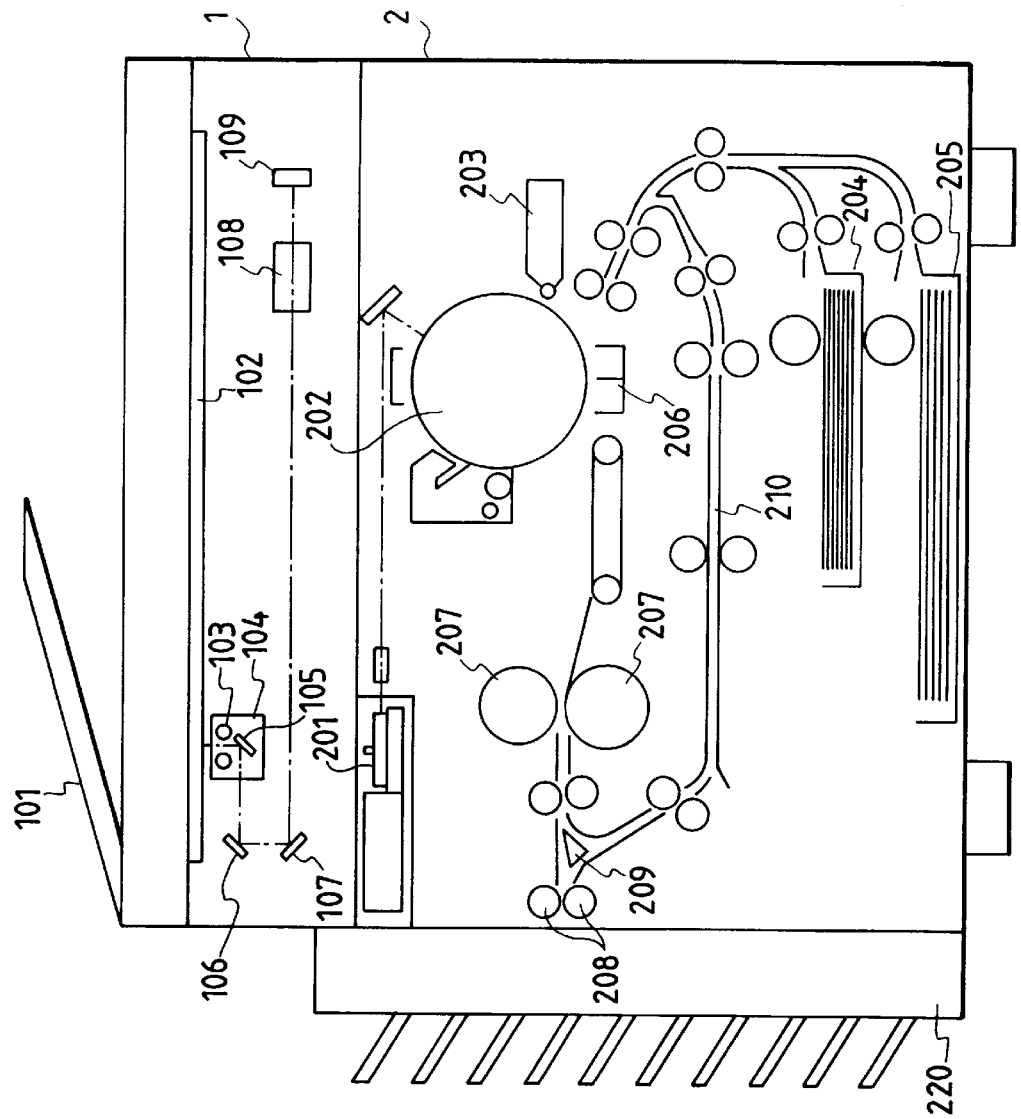
FIG. 2 is a sectional view showing a reader unit and a printer unit in the copy machine according to the first embodiment.

FIG. 2 is a sectional view showing the reader unit 1 and the printer unit 2. Details of these units will be explained also with reference to FIG. 1 if necessary. An original feeder unit 101 on the reader unit 1 sequentially feeds the original one by one from its final page, onto a platen glass 102. After a reading operation of the original terminates, the original feeder unit 101 discharges the original on the platen glass 102. When the original is fed onto the platen glass 102, a lamp 103 is turned on, and a scanner unit 104 starts moving to perform exposure scanning of the original. At this time, a reflected light from the original is introduced into a CCD image sensor (to be referred as CCD hereinafter) 109 by means of mirrors 105 to 107 and a lens 108, whereby the image of the scanned original is read by the CCD 109. The image data which has been output from the CCD 109 is subjected to a predetermined process, and then transferred to the printer unit 2 and the core unit 10 in the image input/output control unit 3.

A laser beam driver (not shown) of the printer unit 2 causes a laser beam generation unit 201 to generate a laser beam according to the image data output from the reader unit 1. The generated laser beam is irradiated onto a photosensitive drum 202, and thus a latent image according to the irradiated laser beam is formed on the photosensitive drum 202. Then, a development agent is attached to latent image portions on the photosensitive drum 202 by a development unit 203. The recording paper is fed from either one of cassettes 204 and 205 at timing in synchronism with irradiation starting of the laser beam, and the fed paper is carried to a transfer unit 206. In the transfer unit 206, the development agent attached to the photosensitive drum 202 is transferred to the recording paper. The recording paper having the development agent thereon is carried to a fixing unit 207, whereby the development agent is fixed to the recording paper by heat and pressure of the fixing unit 207. In this case, the A4-size paper and the A3-size paper are held in the cassettes 204 and 205, respectively.

The recording paper which has passed the fixing unit 207 is discharged by discharge rollers 208, and then a sorter 220 sorts the recording papers by holding the discharged papers in respective bins. The printer unit 2 has the structure in which various modes concerning the output can be set. In such the various modes, in a case where a sorting mode has been set, the sorter 220 holds the recording paper in the uppermost bin. Further, in a case where a two-side recording mode has been set, after the recording paper is carried to the discharge rollers 208, rotational directions of the discharge rollers 208 are inverted such that the paper is introduced into a paper (or sheet) re-feeding path 210 by a flapper 209. Furthermore, in a case where a multiple recording mode has been set, the recording paper is introduced into the paper re-feeding path 210 by the flapper 209 such that the recording paper does not reach the discharge rollers 208. The recording paper introduced into the paper re-feeding path 210 is fed to the transfer unit 206 at the timing in synchronism with the irradiation starting of the laser beam.

Subsequently, the reader unit 1 will be explained in detail hereinafter.

Figure 3:
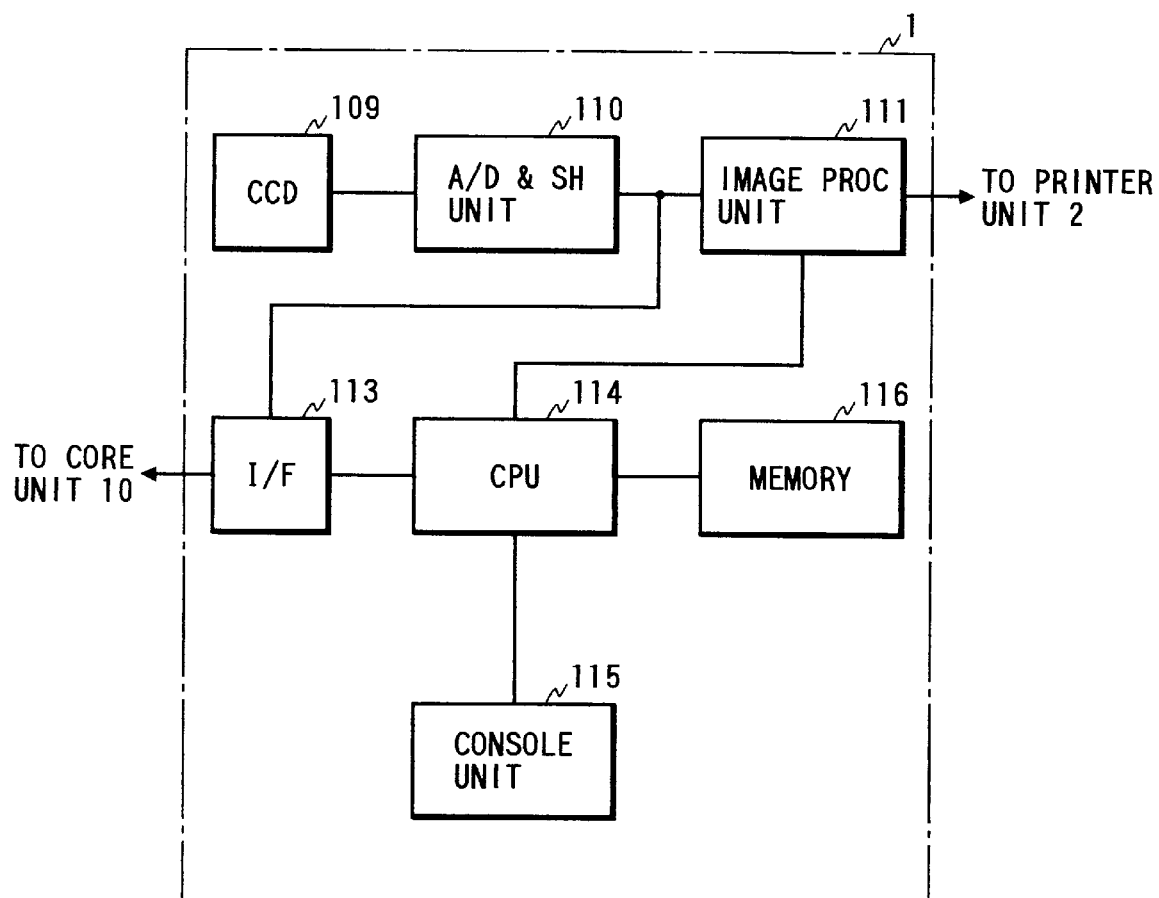
FIG. 3 is a block diagram showing the structure of the reader unit in the copy machine according to the first embodiment.

FIG. 3 is a block diagram showing the structure of the reader unit 1. The image data which has been output from the CCD 109 is subjected to analog-to-digital conversion and shading correction by an A/D and SH (analog-to-digital conversion and shading correction) unit 110 connected to the CCD 109. The image data processed by the A/D and SH unit 110 is then transferred to the printer unit 2 via an image process unit 111 connected to the A/D and SH unit 110, and also transferred to the core unit 10 of the image input/output control unit 3 via an interface 113.

A CPU (central processing unit) 114 which is connected with the image process unit 111, a console unit 115, a memory 116 and the interface 113 controls the image process unit 111 and the interface 113 in accordance with setting contents which have been set in the console unit 115. For example, in a case where a copy mode for performing a trimming process and then performing copy has been set in the console unit 115, the CPU 114 causes the image process unit 111 to perform the trimming process on the image data and then transfer the processed image data to the printer unit 2. Further, a control command according to a facsimile transmission mode is transferred to the core unit 10 by the console unit 115. Such control programs of the CPU 114 have been stored in the memory 116, and thus the CPU 114 performs the control with reference to stored contents of the memory 116. Also, the memory 116 is used as a working area of the CPU 114.

The console unit 115 is structured that filing can be set in accordance with operator's intention. In this case, the filling represents an operation in which facsimile data received by the facsimile unit 4 via the telephone line and electronic mail data received by the computer interface unit 7 via the PC/WS 11 are stored in the optomagnetic disk 521 of the external memory unit 6 and also a search sheet (to be described later) is printed for searching the stored data. A signal representing that the filing has been set is transmitted to the core unit 10 via the interface 113.

Subsequently, the structure of the core unit 10 will be explained in detail hereinafter.

Figure 4:
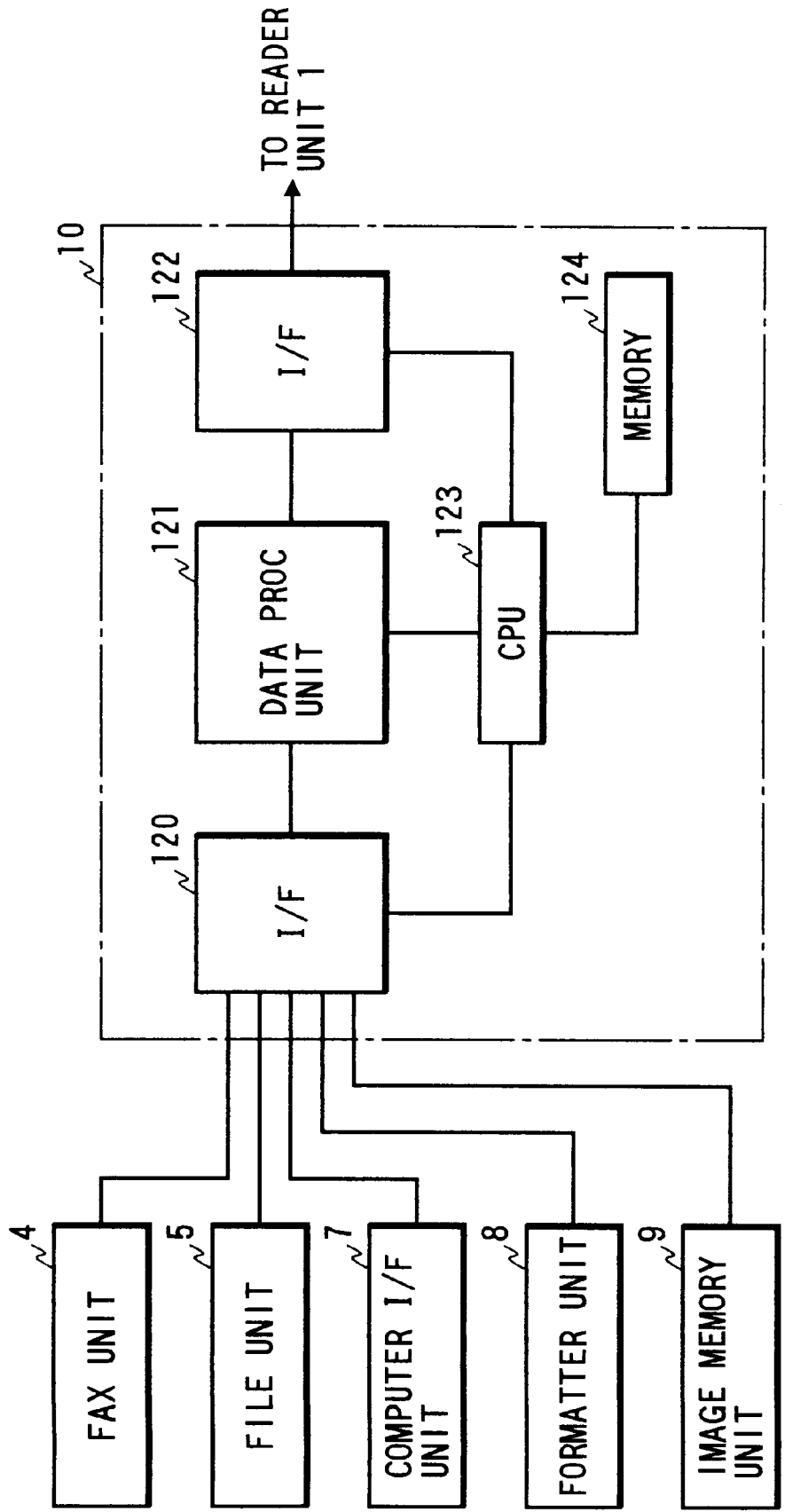
FIG. 4 is a block diagram showing the structure of a core unit in the copy machine according to the first embodiment.

FIG. 4 is a block diagram showing the structure of the core unit 10 and its relative units. The core unit 10 is composed of an interface 120, a data process unit 121, an interface 122, a CPU 123 and a memory 124. The interface 120 is connected with the facsimile unit 4, the file unit 5, the computer interface unit 7, the formatter unit 8 and the image memory unit 9. The data process unit 121 is connected with the interfaces 120 and 122, and the CPU 123 is connected with the interfaces 120 and 122, the data process unit 121 and also the memory 124. The image data from the reader unit 1 is transferred to the data process unit 121 via the interface 122, and the control command from the reader unit 1 is transferred to the CPU 123.

It is determined by the CPU 123 on the basis of a predetermined condition whether or not the received facsimile data, the electronic mail data or the like is actually subjected to the filing or printing output on the recording paper.

The data process unit 121 performs an image process such as an image rotating process, a zooming process or the like. The image data which has been transferred from the reader unit 1 to the data process unit 121 is then transferred to the facsimile unit 4, the file unit 5 and the computer interface unit 7 via the interface 120 in accordance with the control command transferred from the reader unit 1. Further, code data representing the image which code data has been input via the computer interface unit 7 is transferred to the data process unit 121 via the interface 120. After then, the code data is further transferred to the formatter unit 8 and developed into the image data, and thus the obtained image data transferred to the data process unit 121. Subsequently, such the data is transferred to the facsimile unit 4 and the printer unit 2 connected to the reader unit 1. The image data from the facsimile unit 4 is transferred to the data process unit 121, and then transferred to the printer unit 2, the file unit 5 and the computer interface unit 7. Further, the image data from the file unit 5 is transferred to the data process unit 121 and temporarily stored in the memory 125. After then, the stored data is transferred to the printer unit 2, the facsimile unit 4 and the computer interface unit 7.

The CPU 123 performs such controlling in accordance with the control program stored in the memory 124 and a control command transferred from the reader unit 1. Further, the memory 124 is used as a working area of the CPU 123. As described above, composite processes are performed by using the core unit 10 as a central unit.

Figure 5:
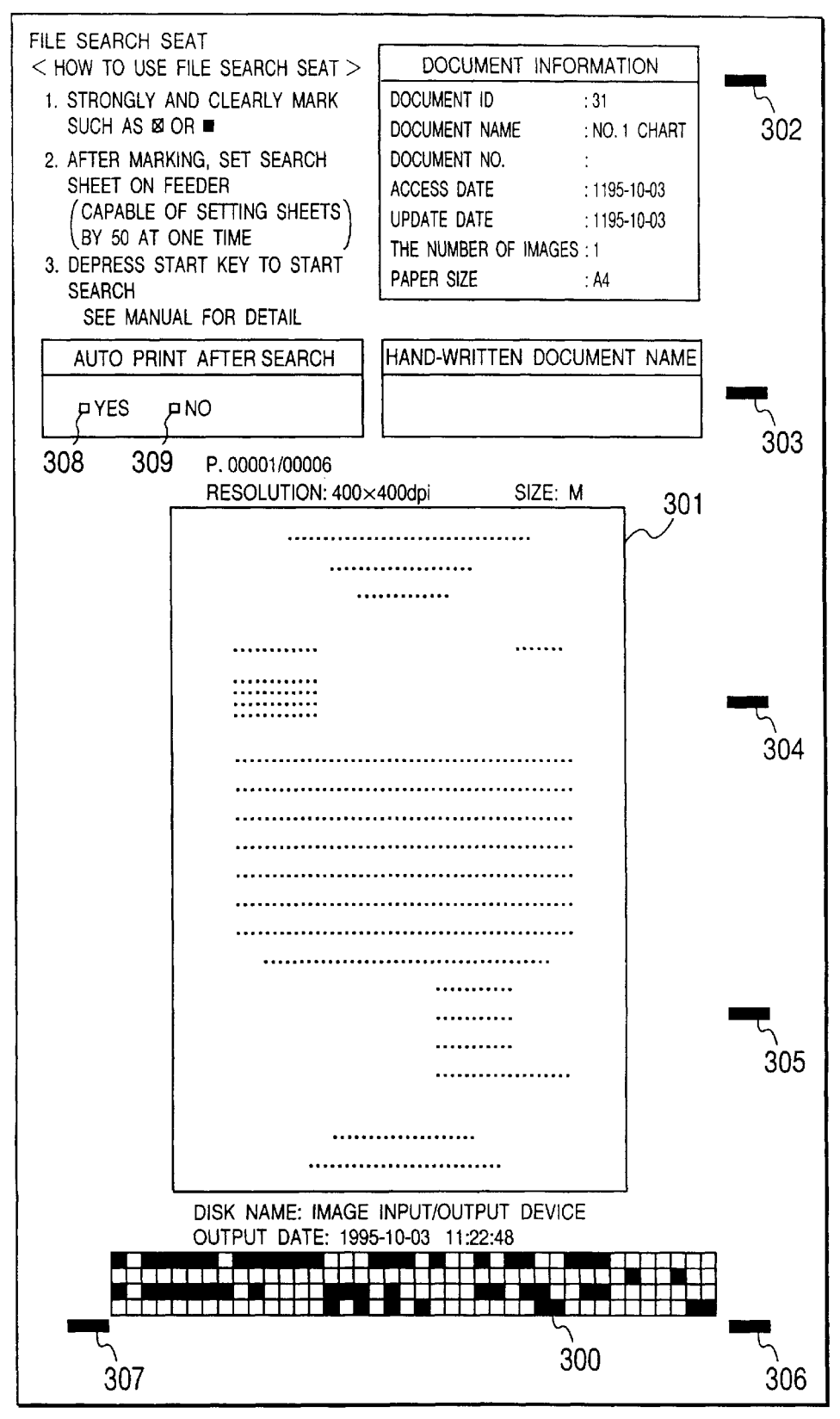

FIG. 5 is a diagram showing an example of the search sheet which is formed by the file unit 5.

After the image data transferred from the core unit 10 is compressed and stored in the optomagnetic disk 521, the image which is formed by the file unit 5 on the basis of the stored image data is printed on the search sheet. Such the image is printed by the printer unit 2 via the core unit 10.

In FIG. 5, reference numeral 300 denotes marking boxes (or marking columns) on which search data to be used for searching the image data are marked or described. In this case, e.g., file information, the above-described keyword or the like may be used as the search data.

Positioning marks 302 to 307 are used to accurately read the search data on the marking boxes 300. For example, in a case where the search sheet is set on the platen glass 102 to be read by the scanner unit 104, if a setting position of the search sheet is not always constant and thus errors in the setting position generate, the reading of the search data on the marking boxes 300 can not be accurately performed. For this reason, the positioning marks 302 to 307 are set to have appropriate shapes and sizes, such that the marks 302 to 307 can be detected even if the positions thereof become aberrant to some extent. Then, amounts of aberration (or displacement) of the once-detected marks 302 to 307 from their inherent positions are respectively obtained, whereby the position at which the marking boxes 300 are to be read is corrected on the basis of the obtained amounts of aberration. After the image data is searched, marking boxes 308 and 309 are used to designate whether or not the searched image data is to be automatically printed.

An image 301 is obtained by appropriately reducing a part (e.g., image of front page) of the image data transferred from the core unit 10, in accordance with a size of the image data. By such the image 301, even if a plurality of different search sheets are formed, an outline of the image data searched by each search sheet can be visually grasped or known, it becomes possible that an operator can easily search the desired search sheet. In this case, there is no need that the image 301 is always reduced. That is, e.g., in a case where one image is transferred from the core unit 10 and further an original size necessary for outputting such the image is equal to or smaller than an area of the image 301, the transferred image is directly added onto the search sheet as the image 301 without reducing its size.

In a case where the image data stored in the optomagnetic disk 521 is searched by using the search sheet, the image data which has been obtained by reading the search sheet with the reader unit 1 is transferred to the file unit 5 via the core unit 10. Then, the search data on the marking boxes 300 are read by the file unit 5. Concretely, the file unit 5 counts the number of black pixels in predetermined area at the predetermined position in the marking boxes 300. Then, if a counted value is equal to or larger than half of the total number of pixels in the predetermined area, the file unit 5 judges the predetermined area as "1". On the other hand, if the counted value is less than half of the total number of pixels, the file unit 5 judges the predetermined area as "0". By performing such judgment for an entire region of the marking boxes 300, the search data is read.

After then, by using the read search data, the file unit 5 searches, from among the compression image data stored in the optomagnetic disk 521, the image data corresponding to such the search data. The searched compression image data is read and expanded by the file unit 5. Then, the expanded data is transferred to the core unit 10 and output or printed by the printer unit 2.

Hereinafter, a data reception process according to the first embodiment of the present invention will be explained in detail. In a copy machine according to the first embodiment, the data which has been received via the telephone line is stored and the search sheet is formed. That is, on the basis of the setting contents by the console unit 115, the CPU 123 determines whether the filing is performed or direct printing is performed.

Figure 6:
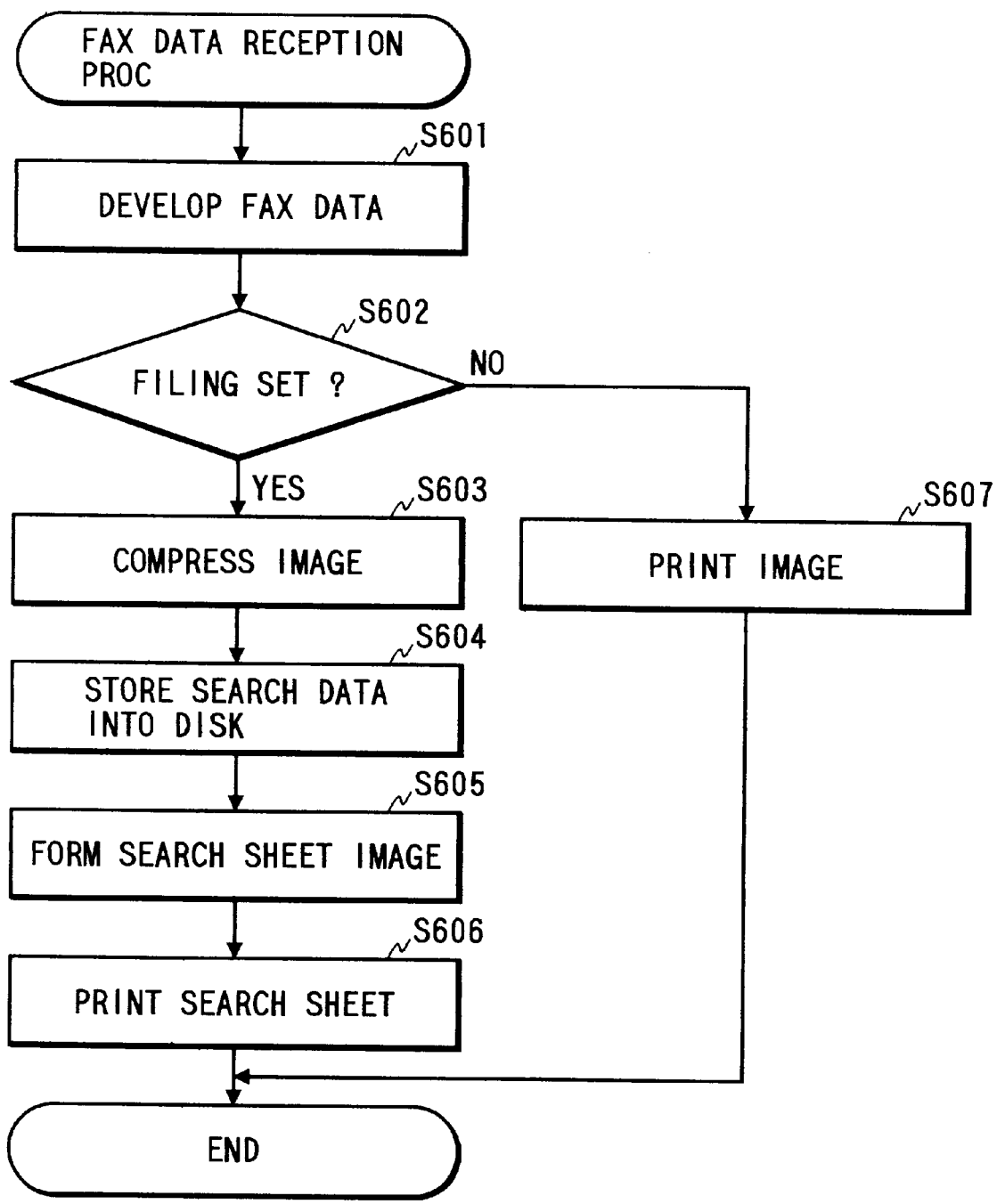
FIG. 6 is a flow chart showing the procedure of a facsimile data reception process in the copy machine according to the first embodiment.

FIG. 6 is a flow chart showing the procedure of a facsimile data reception process in the copy machine according to the first embodiment.

Initially, the facsimile data which has been received by the facsimile unit 4 is also developed by the facsimile unit 4 (step S601), and then the CPU 123 judges whether or not the setting for performing the filing of the facsimile data has been performed by the console unit 115 (step S602).

As a result of such judgment, in a case where the setting for the filing of the facsimile data has been performed, the facsimile unit 4 transfers the developed facsimile data to the file unit 5 via the core unit 10. Then, the file unit 5 compresses the transferred facsimile data (step S603), and stores the search data corresponding to the compression data into the optomagnetic disk 521 together with the transferred facsimile data (step S604). Subsequently, the file unit 5 generates the search sheet in which the search data is added to the facsimile data (step S605). The file unit 5 transfers a generated search sheet image to the reader unit 1 via the core unit 10, and the printer unit 2 outputs or prints the transferred search sheet image, thereby forming the search sheet (step S606). After then, the facsimile data reception process terminates.

On the other hand, in a case where the setting for the filing of the facsimile data has not been performed in the step S602, the facsimile unit 4 transfers the developed facsimile data to the printer unit 2 via the core unit 10. Then, the printer unit 2 outputs or prints all the transferred facsimile data as the visible images (step S607). After then, the facsimile data reception process terminates.

Figure 7:
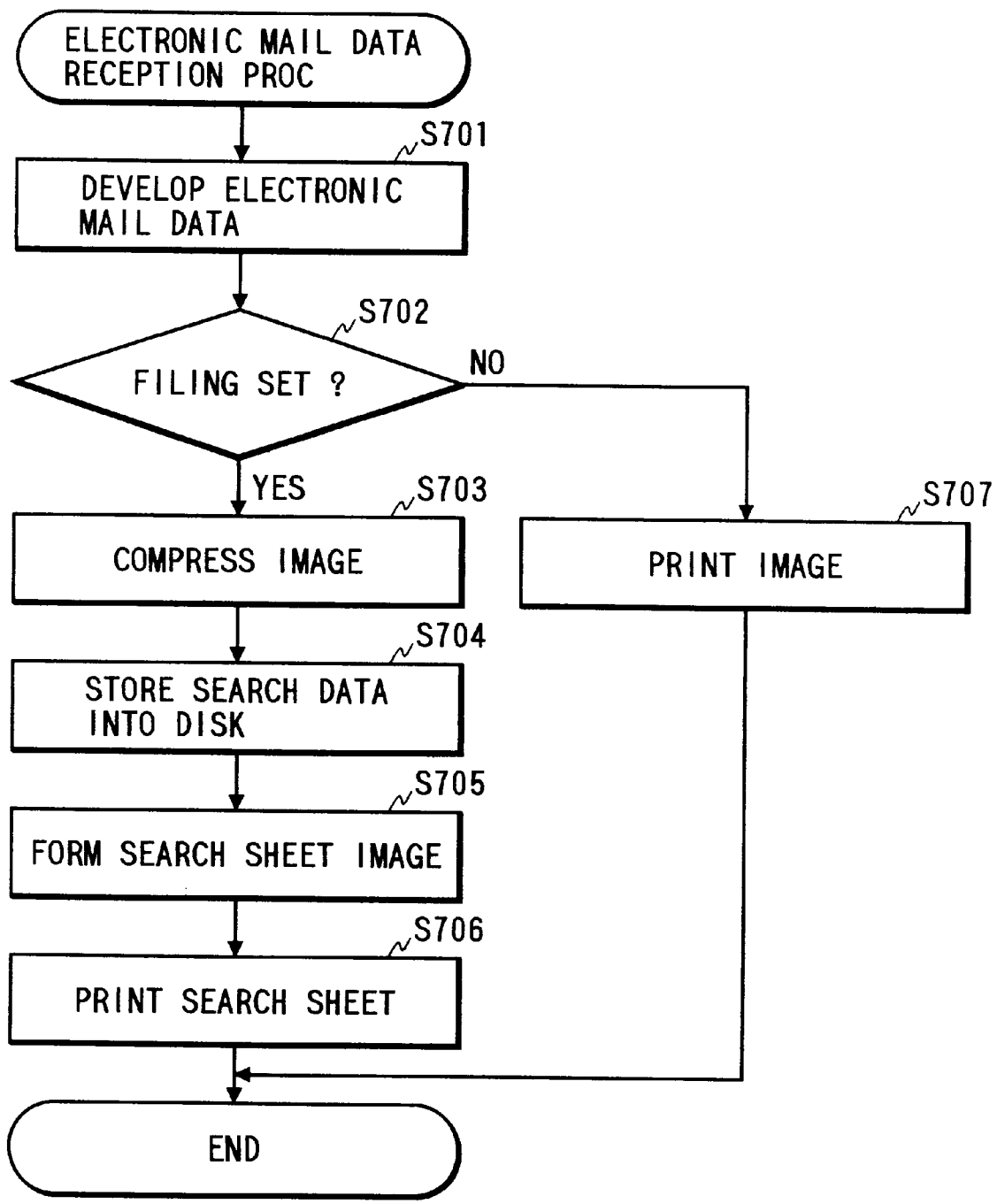
FIG. 7 is a flow chart showing the procedure of an electronic mail data reception process in the copy machine according to the first embodiment.

FIG. 7 is a flow chart showing the procedure of an electronic mail data reception process in the copy machine according to the first embodiment.

The electronic mail data which has been received from the PC/WS 11 via the computer interface unit 7 is developed by the formatter unit 8 (step S701), and then the CPU 123 judges whether or not the filing of the electronic mail data has been set by the console unit 115 (step S702).

As a result of such the judgment, in a case where the filing of the electronic mail data has been set, the formatter unit 8 transfers the developed electronic mail data to the file unit 5 via the core unit 10. Then, the file unit 5 compresses the transferred electronic mail data (step S703), and stores the search data corresponding to the compression data into the optomagnetic disk 521 together with the transferred electronic mail data (step S704). Subsequently, the file unit 5 forms the search sheet in which the search data is added to the electronic mail data (step S705). The file unit 5 transfers the generated search sheet image to the reader unit 1 via the core unit 10, and the printer unit 2 outputs or prints the transferred search sheet image, thereby forming the search sheet (step S706). After then, the electronic mail data reception process terminates.

On the other hand, in a case where the filing of the electronic mail data has not been set in the step S702, the formatter unit 8 transfers the developed electronic mail data to the printer unit 2 via the core unit 10. Then, the printer unit 2 outputs or prints the transferred electronic mail data (step S707). After then, the electronic mail data reception process terminates.

According to the first embodiment of the present invention, the filing of the data or the like which has been received from the facsimile apparatus or the electronic mail transmission apparatus via the telephone line can be also performed. Therefore, the facsimile data or the like can be stored such that the data can be searched later.

Further, in the case where the so-called memory substitute reception function is used together, the operator can freely set whether the received facsimile data or the electronic mail data is subjected to the filing, or such the data is directly output or printed. Therefore, e.g., in a case where the facsimile data or the like is small-capacity data, such the data is not output or printed but is directly subjected to the filing. On the other hand, in a case where the facsimile data or the like is large-capacity data, such the data is not subjected to the filing but is directly output or printed, whereby consumption of the recording paper can be appropriately reduced, and thus the recording paper to be used for the search sheet can be always secured. Therefore, the information concerning the receiver of the facsimile data or the like can be easily grasped or known by using such the search sheet.

Furthermore, since the part of the received facsimile data or the like is output or printed on the search sheet, the outline of such the data can be easily grasped or known.

Second Embodiment

Figure 8:
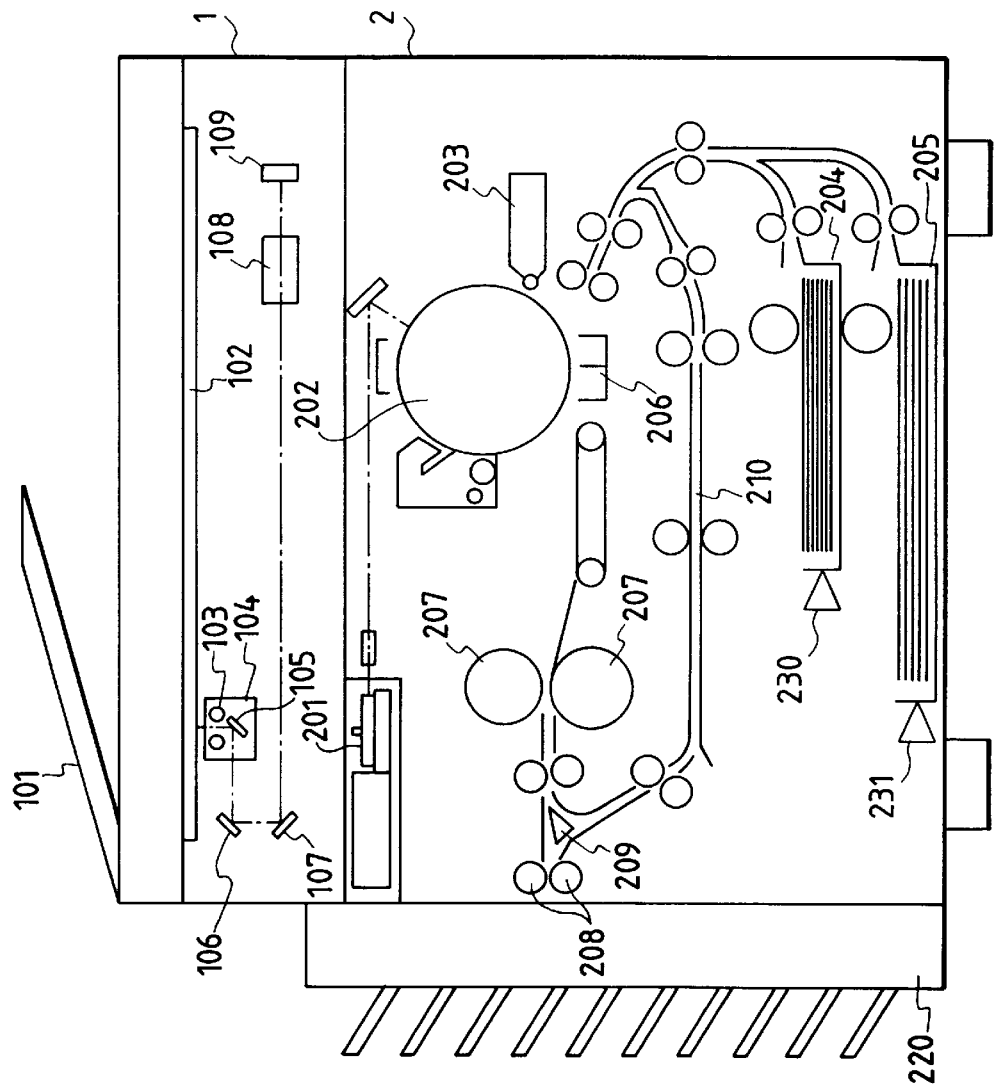
FIG. 8 is a block diagram showing a reader unit and a printer unit in a copy machine according to a second embodiment of the present invention.

Hereinafter, a copy machine according to the second embodiment of the present invention will be explained. The structure of the copy machine is substantially the same as that of the copy machine according to the first embodiment. Therefore, the entire structure of the copy machine is the same as that shown in FIG. 1, a reader unit 1 is the same as that shown in FIG. 3, and a core unit 10 is the same as that shown in FIG. 4. Further, FIG. 8 is a sectional view showing the reader unit 1 and a printer unit 2. To provide in the printer unit 2 a sensor for detecting a residual amount of recording paper is only the point different from the copy machine according to the first embodiment. Therefore, in FIG. 8, the same elements as in FIG. 2 are added with the same reference numerals, respectively.

In FIG. 8, a sensor 230 for detecting the residual amount of the recording paper in a cassette 204 is provided on one side of the cassette 204, and a sensor 231 for detecting the residual amount of the recording paper in a cassette 205 is provided on one side of the cassette 205. Each sensor detects whether or not the recording paper in each cassette does not reach a predetermined amount A, in a known method using light, a contact member or the like. For example, there is set that the contact member comes not to contact with the cassette when a total thickness or height of the bundled recording paper becomes equal to or less than a thickness (e.g., 5 mm) corresponding to the predetermined amount A, thereby detecting the residual amount of the recording paper.

A signal representing a detection result is transferred to the core unit 10 via the reader unit 1. Then, on the basis of the transferred signal representing the detection result, a CPU 123 of the core unit 10 determines whether facsimile data or electronic mail data is to be subjected to filing or to be directly output or printed. Further, on the basis of the signal representing the detection result transferred from the sensor 230 or 231, a CPU 114 causes a console unit 115 to perform predetermined display, so as to notify an operator that the residual amount of the recording paper has dwindled.

Figure 9:
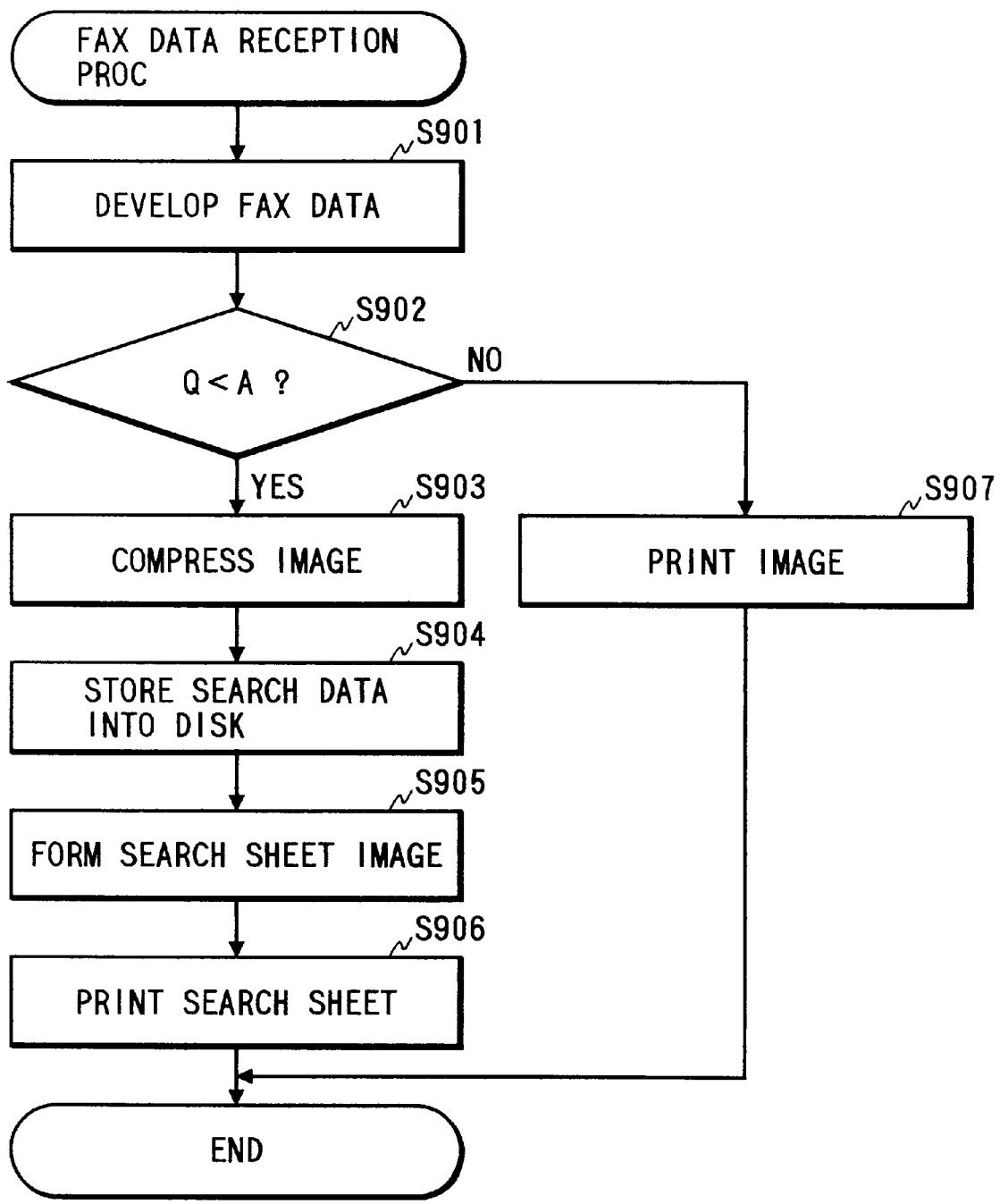
FIG. 9 is a flow chart showing the procedure of a facsimile data reception process in the copy machine according to the second embodiment.

FIG. 9 is a flow chart showing the procedure of a facsimile data reception process by the copy machine according to the second embodiment.

Initially, in a step S901, the same process as in the step S601 of FIG. 6 is performed. In a subsequent step S902, on the basis of the signal representing the detection result of the sensor 230, the CPU 123 judges whether or not a residual amount Q of the recording paper having a size (i.e., it is assumed that the A4-size recording paper in the cassette 204 is used in the second embodiment) suitable for outputting or printing the reception facsimile data is smaller than the predetermined amount A.

As a result of such judgment, if relation Q<A is satisfied, in steps S903, S904, S905 and S906, the same processes as in the steps S603, S604, S605 and S606 of FIG. 6 are performed. After then, the facsimile data reception process terminates.

On the other hand, if relation $Q \geq A$ is satisfied in the step S902, there is judged that the residual amount of the recording paper remains yet. Therefore, in a step S907, the same process as in the step S607 of FIG. 6 is performed. After then, the facsimile data reception process terminates.

Figure 10:
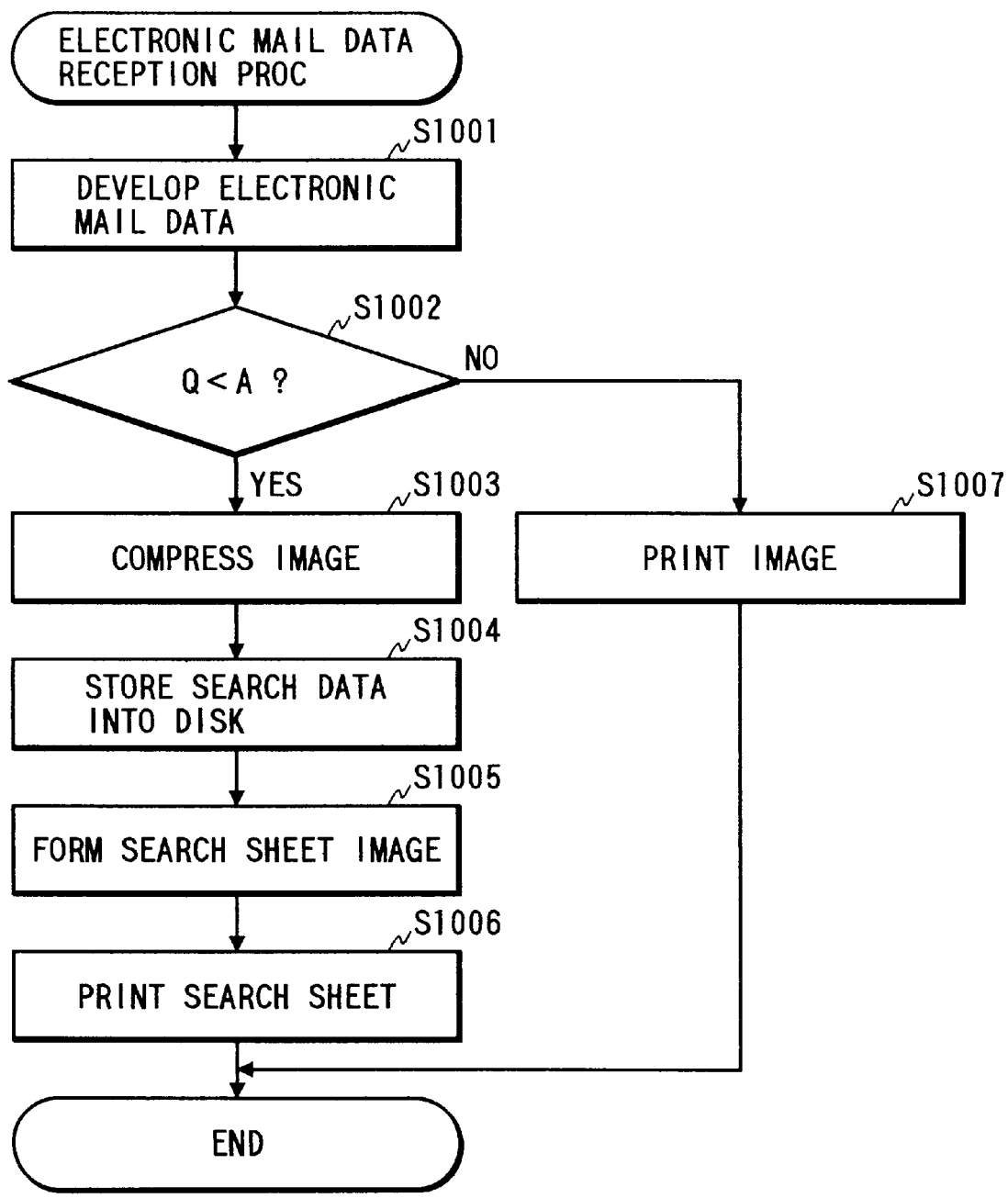
FIG. 10 is a flow chart showing the procedure of an electronic mail data reception process in the copy machine according to the second embodiment.

FIG. 10 is a flow chart showing the procedure of an electronic mail data reception process by the copy machine according to the second embodiment.

Initially, in a step S1001, the same process as in the step S701 of FIG. 7 is performed. In a subsequent step S1002, on the basis of the signal representing the detection result of the sensor 230, the CPU 123 judges whether or not the residual amount Q of the recording paper having the size (i.e., it is assumed that the A4-size recording paper in the cassette 204 is used in the second embodiment) suitable for outputting or printing the reception electronic mail data is smaller than the predetermined amount A.

As a result of such judgment, if relation Q<A is satisfied, in steps S1003, S1004, S1005 and S1006, the same processes as in the steps S703, S704, S705 and S706 of FIG. 7 are performed. After then, the electronic mail data reception process terminates.

On the other hand, if relation $Q \geq A$ is satisfied in the step S1002, there is judged that the residual amount of the recording paper remains yet. Therefore, in a step S1007, the same process as in the step S707 of FIG. 7 is performed. After then, the electronic mail data reception process terminates.

According to the second embodiment, as the effects of the filing of the facsimile data or the electronic mail data, the same effects as in the first embodiment can be obtained. In addition, in case of using a so-called memory substitute reception function together, there is determined based on the residual amount Q of the recording paper whether the received facsimile data or the like is subjected to the filing or all the data are directly output or printed. Therefore, if the residual amount Q is smaller than the predetermined amount A, the recording paper is not consumed. On the other hand, only if the amount Q is equal to or larger than the amount A, the recording paper is consumed. For this reason, abrupt consumption of the recording paper can be appropriately suppressed, whereby it becomes easy to always secure the recording paper for the search sheet. Therefore, the same effects as in the first embodiment can be obtained in case of securing the output of the search sheet of the facsimile data and the electronic mail data, grasping outlines of these data and the like.

Third Embodiment

Figure 11:
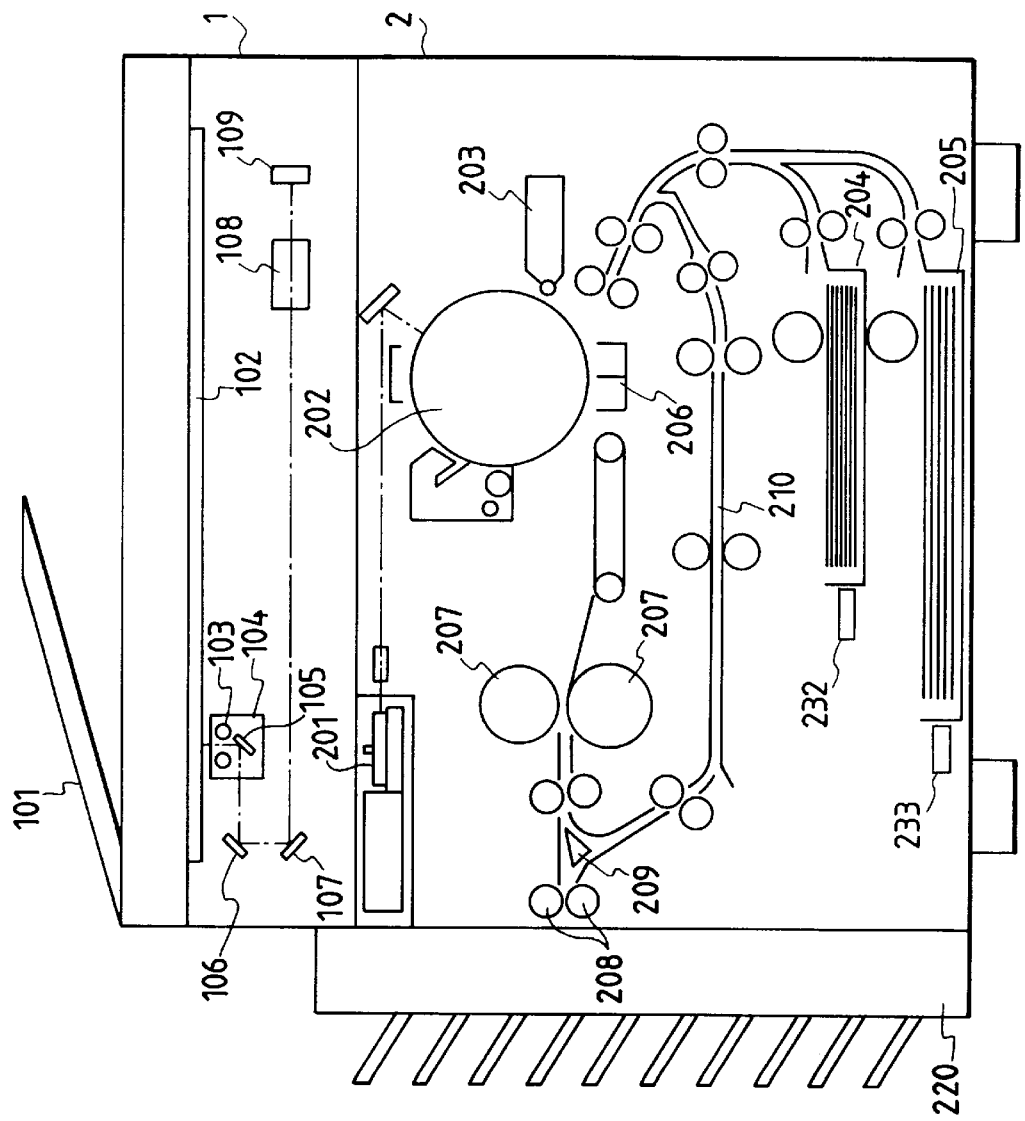
FIG. 11 is a sectional view showing a reader unit and a printer unit in a copy machine according to a third embodiment of the present invention.

Hereinafter, a copy machine according to the third embodiment of the present invention will be explained. The structure of the copy machine is substantially the same as that of the copy machine according to the first embodiment. Therefore, the entire structure of the copy machine is the same as that shown in FIG. 1, a reader unit 1 is the same as that shown in FIG. 3, and a core unit 10 is the same as that shown in FIG. 4. Further, FIG. 11 is a sectional view showing the reader unit 1 and a printer unit 2. To provide in the printer unit 2 a sensor for detecting opening and closing of a cassette is only the point different from the copy machine according to the first embodiment. Therefore, in FIG. 11, the same elements as in FIG. 2 are added with the same reference numerals, respectively.

In FIG. 11, a sensor 232 is provided on one side of a cassette 204, and also a sensor 233 is provided on one side of a cassette 205. The sensor 232 detects that the cassette 204 has been opened, and transfers a detection signal representing such a detected fact to a CPU 114 of the printer unit 2. Similarly, the sensor 233 detects that the cassette 205 has been opened, and transfers a detection signal representing such a fact to the CPU 114 of the printer unit 2.

Generally, an operation for opening the cassette 204 or the like is the operation which is performed to supply the recording paper when there is no recording paper in the cassette. Further, an amount of the recording paper to be held or supplied in the cassette is substantially constant. For this reasons, there is supposed that the number of the residual recording paper (i.e., sheets) in the cassette 204 or the like can be detected on the basis of the opening operation of the cassette 204 or the like and the using (i.e., supplying) operation of the recording paper.

That is, a counter value CA204N representing the number of the residual recording paper in the cassette 204 and a counter value CA205N representing the number of the residual recording paper in the cassette 205 are stored in a memory 116. Then, every time one sheet of the recording paper is fed from the cassette 204, i.e., every time one sheet of the recording paper is used for a copying process, the CPU 114 performs a subtraction process to subtract "1" from the counter value CA204N. On the other hand, every time the CPU 114 receives from the sensor 232 the detection signal representing that the cassette 204 has been opened, the CPU 114 resets the counter value CA204N for a value MAX, i.e., the maximum number of the recording paper capable of being stocked or held in the cassette 204. As a result of such processes based on the paper supplying operation and the cassette opening operation, the counter value CA204N can be used as the value representing the number of the residual recording paper in the cassette 204. Further, by the same processes, the counter value CA205N can be used as the value representing the number of the residual recording paper in the cassette 205.

In the third embodiment, signals representing the counter values CA204N and CA205N both obtained by the CPU 114 are transferred to the core unit 10. Then, a CPU 123 in the core unit 10 compares each of these transferred signals with a predetermined number B, and then determines whether reception facsimile data or reception electronic mail data is subjected to filing or is directly output or printed.

Figure 12:
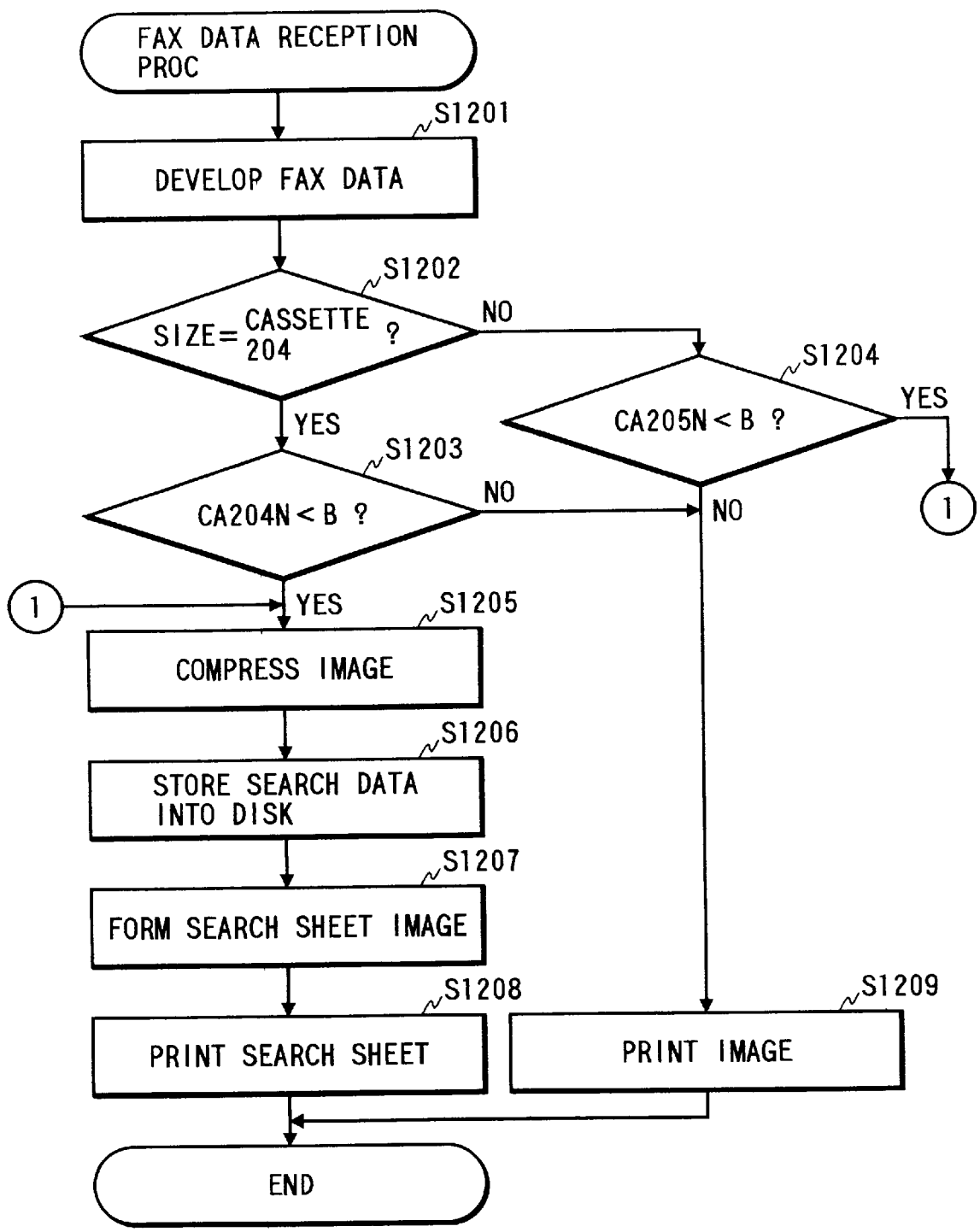
FIG. 12 is a flow chart showing the procedure of a facsimile data reception process in the copy machine according to the third embodiment.

FIG. 12 is a flow chart showing the procedure of a facsimile data reception process by the copy machine according to the third embodiment.

Initially, in a step S1201, the same process as in the step S601 of FIG. 6 is performed. In a subsequent step S1202, the CPU 123 judges whether or not a recording-paper size suitable for printing the reception facsimile data coincides with a size of the recording paper in the cassette 204. As a result of such judgment, if both the sizes are coincided with each other, the flow advances to a step S1203. On the other hand, if not coincided, the flow advances to a step S1204.

In the step S1203, the CPU 123 judges whether or not the counter value CA204N is smaller than the predetermined number B. On the other hand, in the step S1204, the CPU 123 judges whether or not the counter value CA205N is smaller than the predetermined number B.

As a result, if relation CA204N<B is satisfied in the step S1203, or if relation CA205N<B is satisfied in the step S1204, the flow advances to a step S1205. On the other hand, if relation CA204N≧B is satisfied in the step S1203, or if relation CA205N≧B is satisfied in the step S1204, the flow advances to a step S1209.

Therefore, if the number of the residual recording paper in the cassette 204 or 205 is smaller than the predetermined value B, the filing is performed. On the other hand, if the number of the residual recording paper in the cassette 204 or 205 is equal to or larger than the predetermined value B, the direct outputting or printing is performed.

Concretely, in steps S1205, S1206, S1207 and S1208, the same processes as in the steps S603, S604, S605 and S606 of FIG. 6 are performed. Further, in the step S1209, the same process as in the step S607 of FIG. 6 is performed. After then, the facsimile data reception process terminates.

Figure 13:
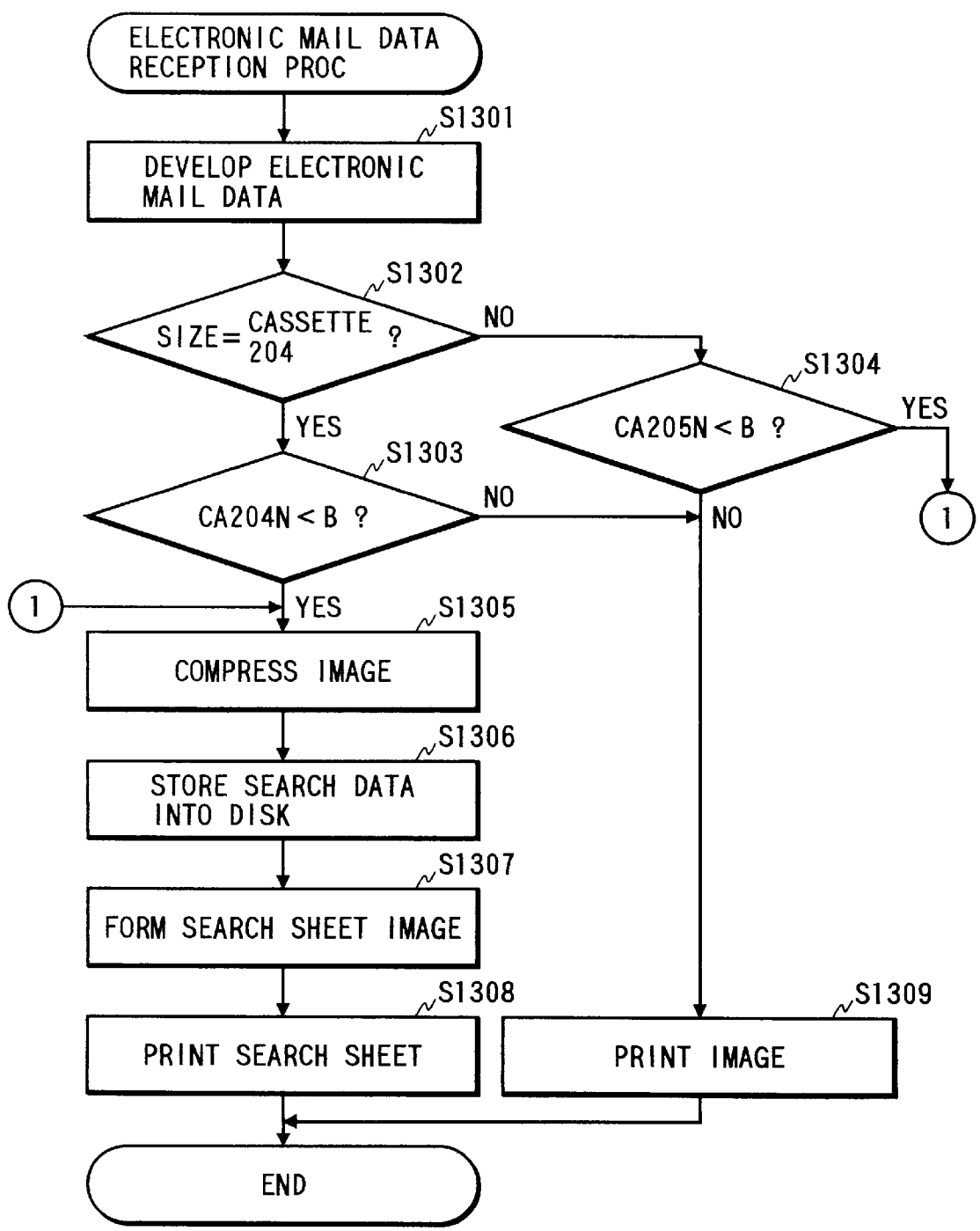
FIG. 13 is a flow chart showing the procedure of an electronic mail data reception process in the copy machine according to the third embodiment.

FIG. 13 is a flow chart showing the procedure of an electronic mail data reception process by the copy machine according to the third embodiment.

Initially, in a step S1301, the same process as in the step S701 of FIG. 7 is performed. In a subsequent step S1302, the CPU 123 judges whether or not a recording-paper size suitable for printing the reception electronic mail data coincides with the size of the recording paper in the cassette 204. As a result of such judgment, if both the sizes are coincided with each other, the flow advances to a step S1303. On the other hand, if not coincided, the flow advances to a step S1304.

In the step S1303, the CPU 123 judges whether or not the counter value CA204N is smaller than the predetermined number B. On the other hand, in the step S1304, the CPU 123 judges whether or not the counter value CA205N is smaller than the predetermined number B.

As a result, if the relation CA204N<B is satisfied in the step S1303, or if the relation CA205N<B is satisfied in the step S1304, the flow advances to a step S1305. On the other hand, if the relation CA204N≧B is satisfied in the step S1303, or if the relation CA205N≧B is satisfied in the step S1304, the flow advances to a step S1309.

That is, if the number of the residual recording paper in the cassette 204 or 205 is smaller than the predetermined value B, the filing is performed. On the other hand, if the number of the residual recording paper in the cassette 204 or 205 is equal to or larger than the predetermined value B, the direct outputting or printing is performed.

Concretely, in steps S1305, S1306, S1307 and S1308, the same processes as in the steps S703, S704, S705 and S706 of FIG. 7 are performed. Further, in the step S1309, the same process as in the step S707 of FIG. 7 is performed. After then, the electronic mail data reception process terminates.

In the third embodiment, when the cassette is opened, a console unit 115 is caused to perform displaying to urge an operator into supplying the recording paper up to the maximum number of paper (i.e., sheets) capable of being held in this cassette. In this case, if the operator does not obey such an urge or a request, the operator is caused to change the value MAX of the value CA204N or CA205N.

According to the third embodiment, the same effects as in the second embodiment can be obtained. In addition, since the number of the recording paper in the cassette 204 or the like is detected and there is determined based on such the detection result whether the printing or the like should be allowed or not, the more accurate number of the recording paper can be secured.

Fourth Embodiment

Hereinafter, a copy machine according to the fourth embodiment of the present invention will be explained. The structure of the copy machine is substantially the same as that of the copy machine according to the first embodiment. Therefore, the entire structure of the copy machine is the same as that shown in FIG. 1, a sectional view of a reader unit 1 and a printer unit 2 is the same as FIG. 2, the reader unit 1 is the same as that shown in FIG. 3, and a core unit 10 is the same as that shown in FIG. 4.

In the fourth embodiment, the necessary number (NF) of a recording paper which is necessary for printing reception facsimile data onto the A4-size recording paper is obtained, and further the necessary number (NE) of the recording paper which is necessary for printing reception electronic mail data onto the A4-size recording paper is obtained.

The necessary number NF of the recording paper is calculated by a CPU 123 on the basis of the facsimile data expanded by a facsimile unit 4, and the necessary number NE of the recording paper is calculated by a PC/WS (personal computer or work station) 11. In this case, a signal representing the necessary number NE is transferred to a formatter unit 8 via the core unit 10, together with the reception electronic mail data.

On the basis of the necessary number NF or NE of the recording paper, the CPU 123 determines whether or the facsimile data or the electronic mail data is to be subjected to filing or is directly output or printed.

Figure 14:
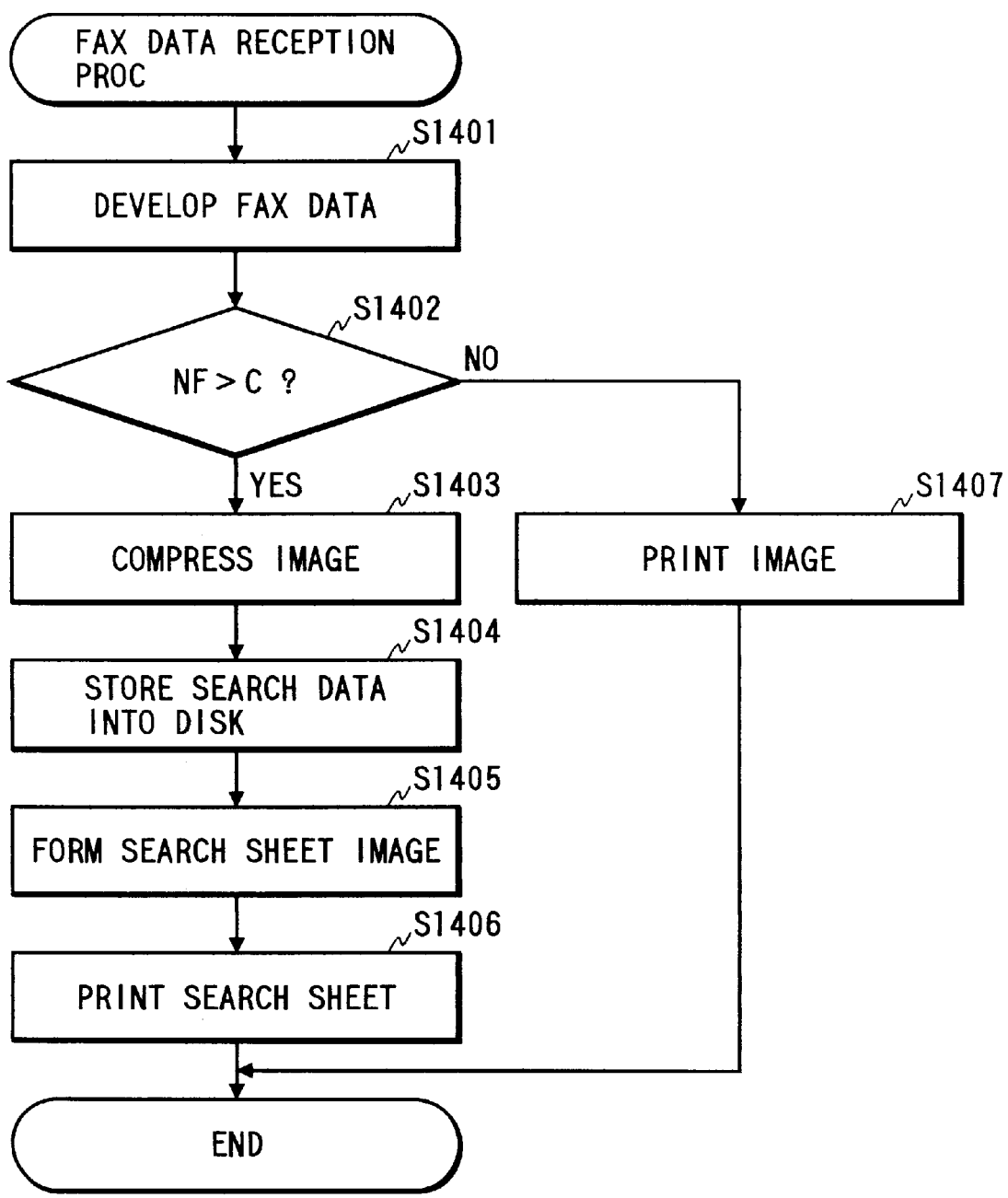
FIG. 14 is a flow chart showing the procedure of a facsimile data reception process in a copy machine according to a fourth embodiment of the present invention.

FIG. 14 is a flow chart showing the procedure of a facsimile data reception process by the copy machine according to the fourth embodiment.

Initially, in a step S1401, the same process as in the step S601 of FIG. 6 is performed. In a subsequent step S1402, the CPU 123 judges whether or not the necessary number NF of the recording paper is larger than a predetermined number C (e.g., ten sheets) of the recording paper.

As a result of such judgment, if relation NF>C is satisfied, in steps S1403, S1404, S1405 and S1406, the same processes as in the steps S603, S604, S605 and S606 of FIG. 6 are performed. After then, the facsimile data reception process terminates.

On the other hand, if relation NF≦C is satisfied in the step S1402, in a step S1407, the same process as in the step S607 of FIG. 6 is performed. After then, the facsimile data reception process terminates.

FIG. 15 is a flow chart showing the procedure of an electronic mail data reception process by the copy machine according to the fourth embodiment.

Initially, in a step S1501, the same process as in the step S701 of FIG. 7 is performed. In a subsequent step S1502, the CPU 123 judges whether or not the necessary number NE of the recording paper is larger than the predetermined number C of the recording paper.

As a result of such judgment, if relation NE>C is satisfied, in steps S1503, S1504, S1505 and S1506, the same processes as in the steps S703, S704, S705 and S706 of FIG. 7 are performed. After then, the electronic mail data reception process terminates.

On the other hand, if relation NE≦C is satisfied in the step S1502, in a step S1507, the same process as in the step S707 of FIG. 7 is performed. After then, the facsimile data reception process terminates.

According to the fourth embodiment, as the effects obtained by performing the filing of the facsimile data or the electronic mail data, the same effects as in the first embodiment can be obtained. In addition, in case of using a so-called memory substitute reception function together, there is determined whether the reception data or the reception electronic mail data is to be subjected to the filing or is directly output or printed, on the basis of the necessary number NF or NE of the recording paper which is necessary in outputting or printing such the facsimile data or the electronic mail data. Therefore, if the necessary number NF or NE of the recording paper is larger than the predetermined number C, the outputting or printing is inhibited. For this reason, there can be prevented that the plenty of recording paper are consumed at a time, whereby the recording paper to be used for a search sheet can be always secured. As a result, the same effects as in the first embodiment can be obtained in case of securing the output of the search sheet of the facsimile data or the electronic mail data, grasping outlines of such the data and the like.

In the first to fourth embodiments, the reduction image is used as the image 301 of the search sheet. However, the present invention is not limited to this. That is, the part of the image concerning the facsimile data may be cut off to be used as the image 301. That is, any image by which the outline of the original image can be grasped may be used as the image 301.

Further, the reception data to be subjected to the process in the first to fourth embodiments is not limited to the facsimile data or the electronic mail data. That is, another data which is received from an external apparatus may be used.

Furthermore, the predetermined amount A, the predetermined number B and the predetermined number C may be changed in accordance with conditions (e.g., length of holidays and the like).

(Explanation of Searching Process)

Hereinafter, there will be explained the searching process in which the image on the search sheet shown in FIG. 5 is read by the reader unit 1 to search an original image and then the searched image is printed.

FIGS. 16A to 16D are views for explaining directions of the search sheet which has been placed on the platen glass 102 in case of reading the image on the search sheet with the reader unit 1.

Figure 16A:
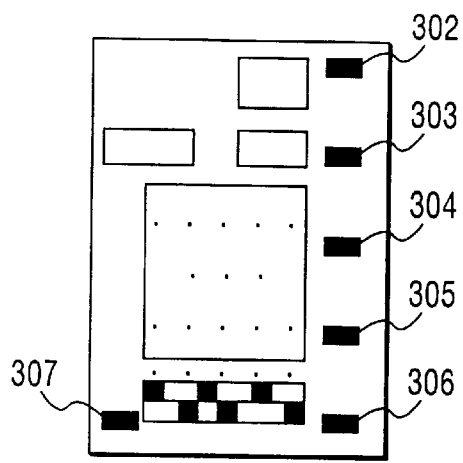
FIGS. 16A, 16B, 16C and 16D are views showing mounting directions of the search sheet.
Figure 16B:
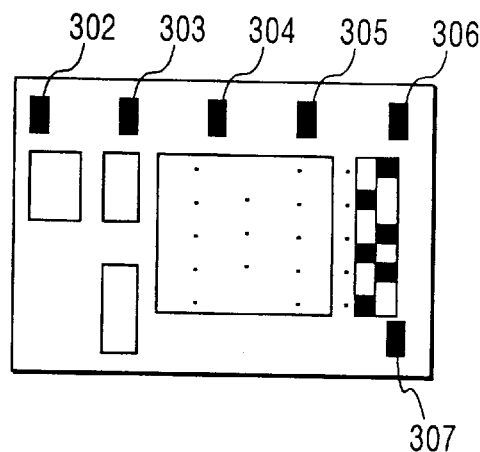

If it is assumed that FIG. 16A shows a case where the search sheet is placed at an angle 0° for a reference position on the platen glass 102, FIG. 16B shows a case where the search sheet is placed at an angle rotated by 90°.

Figure 16C:
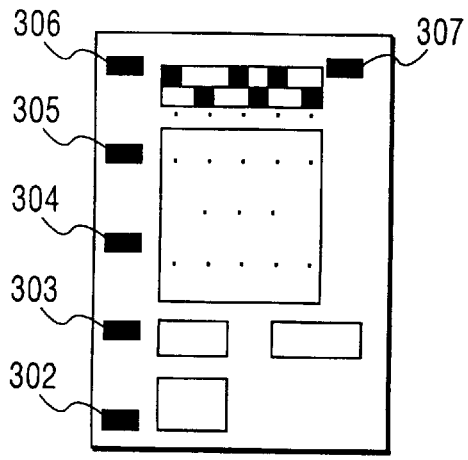
Figure 16D:
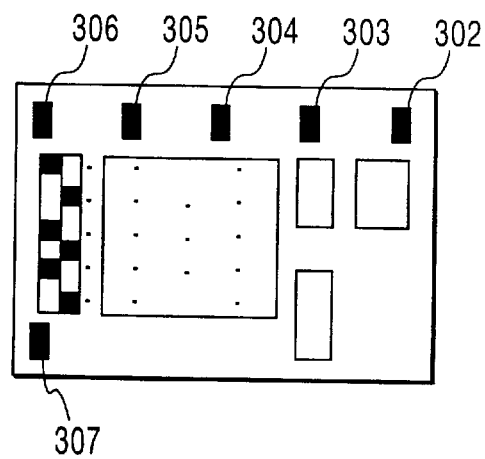

Further, FIG. 16C shows a case where the search sheet is placed at an angle rotated by 180°, and FIG. 16D shows a case where the search sheet is placed at an angle rotated by 270°. That is, there is possible that the search sheet is placed in one of the above-described four directions.

Figure 17:
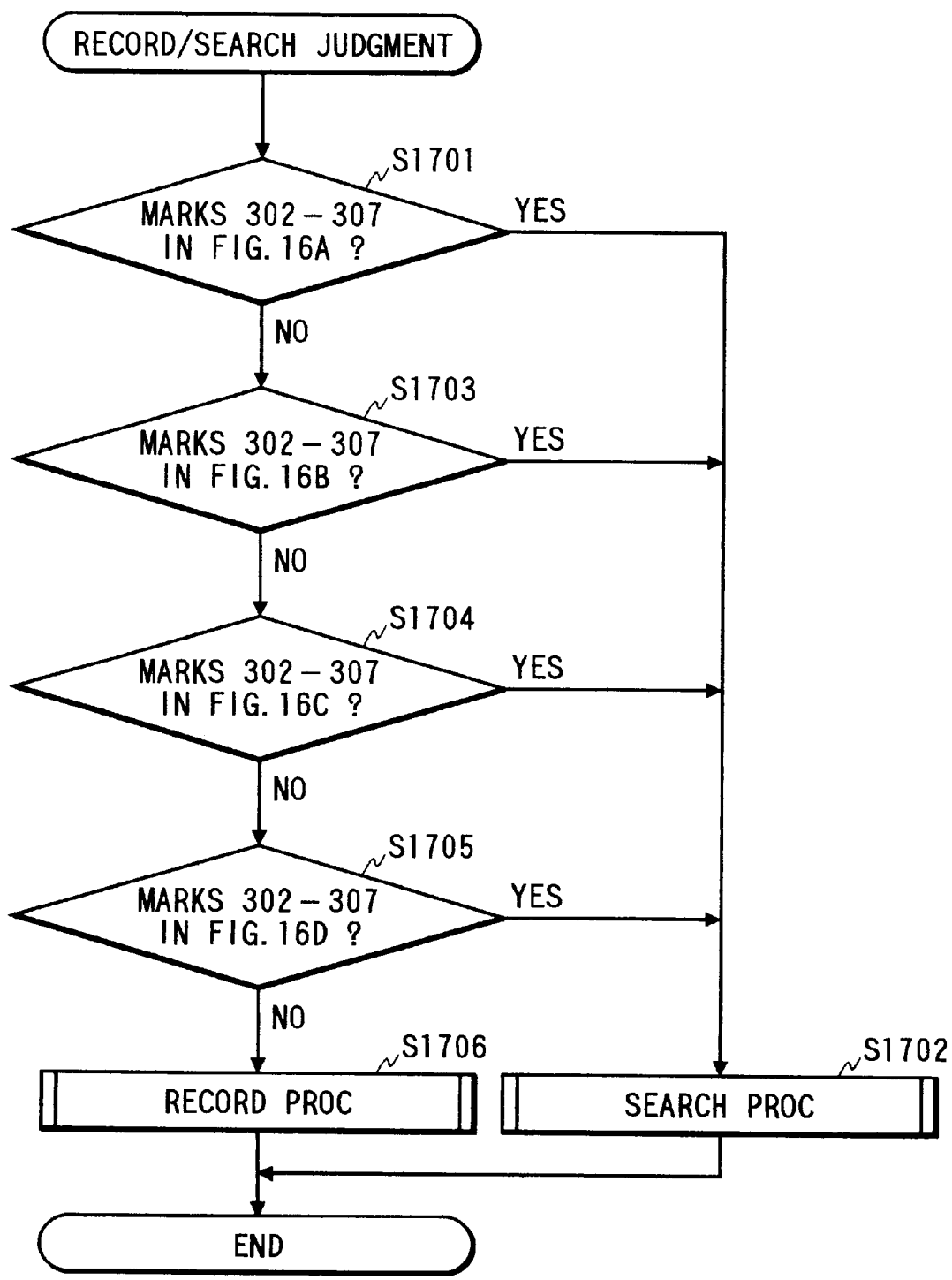
FIG. 17 is a flow chart showing the procedure of a process in a case where an original is read by a reader unit 1.

FIG. 17 is a flow chart showing a recording and searching process in a case where a some original (including search sheet) is set on the reader unit 1 and then a start key (i.e., recording and searching execution key) of the console unit 115 is depressed.

In steps S1701 and S1703 to S1705, there is judged whether or not the image which has been read by the reader unit 1 is the search sheet.

The step S1701 indicates the process for judging whether or not the search sheet is being placed on the platen glass 102 as shown in FIG. 16A (i.e., angle 0°). In this step, it is judged whether or not there are marks 302 to 307 on such the positions as shown in FIG. 16A. Then, in a case where the marks 302 to 307 could be normally confirmed, there is judged that the original read by the reader unit 1 is the search sheet, and a searching process in a step S1702 is performed according to the contents of the search sheet.

The step S1703 indicates the process for judging whether or not the search sheet is being placed as shown in FIG. 16B (i.e., angle 90°). In this step, it is judged whether or not there are the marks 302 to 307 on such the positions as shown in FIG. 16B. Then, in a case where the marks 302 to 307 could be normally confirmed, there is judged that the original read by the reader unit 1 is the search sheet, and the searching process in the step S1702 is performed according to the contents of the search sheet.

The step S1704 indicates the process for judging whether or not the search sheet is being placed as shown in FIG. 16C (i.e., angle 180°). In this step, it is judged whether or not there are the marks 302 to 307 on such the positions as shown in FIG. 16C. Then, in a case where the marks 302 to 307 could be normally confirmed, there is judged that the original read by the reader unit 1 is the search sheet, and the searching process in the step S1702 is performed according to the contents of the search sheet.

The step S1705 indicates the process for judging whether or not the search sheet is being placed as shown in FIG. 16D (i.e., angle 270°). In this step, it is judged whether or not there are the marks 302 to 307 on such the positions as shown in FIG. 16D. Then, in a case where the marks 302 to 307 could be normally confirmed, there is judged that the original read by the reader unit 1 is the search sheet, and the searching process in the step S1702 is performed according to the contents of the search sheet.

If the judged result does not coincide with the result in any one of the four steps S1701, S1703, S1704 and S1705, there is judged that the original read by the reader unit 1 is not the search sheet, and then a recording process in a step S1706 is performed. That is, the image data which has been obtained by reading the original with the reader unit 1 is recorded on the recording paper as the visible image by the printer unit 2, whereby copying of the original image is performed.

As a result, in case of setting the original, there is no need for the operator to set by using the console unit 115 whether the searching is to be performed or the recording is to be performed. That is, on the basis of the one-time depression (i.e., one action) of the start key, the recording and the searching can be selectively performed.

Even in a case where there are a plurality of sizes of the search sheet, it can cope with such the case by performing the search sheet judging process (steps S1701, S1703 to S1705) according to the paper size.

Figure 18:
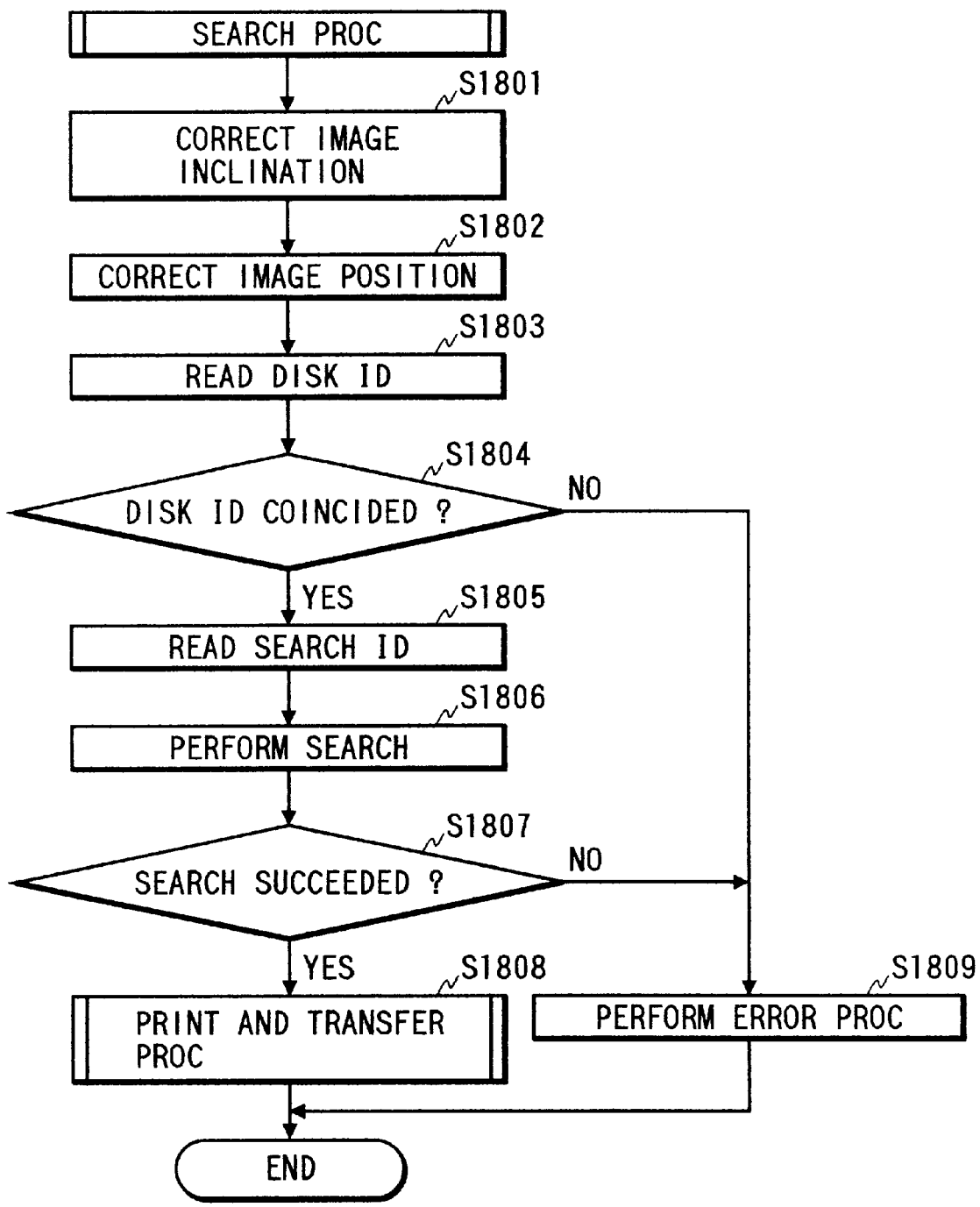
FIG. 18 is a flow chart showing the procedure of a process that image data is searched by reading the search sheet with the reader unit 1.

FIG. 18 is a flow chart showing the searching process in the step S1702. That is, in the searching process, after the image read by the reader unit 1 was judged as the image of the search sheet, the target image data is searched from the data stored in the optomagnetic disk 521.

The image read by the reader unit 1 is not always at the accurate position (i.e., 0°, 90°, 180° or 270°). That is, the actual position of the image tends to be slightly inclined or aberrant (or displaced).

Therefore, an inclination angle of the image is calculated on the basis of relative aberration or displacement of the marks 302 to 307 from respective central positions. Then, based on the calculated inclination angle, the angle is corrected (step S1801). Further, based on aberration situations, the image position is corrected (step S1802).

Subsequently, it is read a DISK ID (disk identification) which is inherent for each optomagnetic disk described in a portion corresponding to the mark 300 on the search sheet image which has been read by the reader unit 1 (step S1803). Then, it is judged whether or not the read DISK ID coincides with that of the optomagnetic disk 521 which has been set in the external memory unit 6 (step S1804). If not coincided, such the optomagnetic disk is not the disk in which the target image data has been recorded, whereby an error process in a step S1810 is performed.

On the other hand, if coincided, a search ID of the image data intended to be searched is read from the portion corresponding to the mark 300 (step S1805), and the searching of the image data in the optomagnetic disk is performed (step S1806).

After then, it is judged whether or not the searching has been succeeded (step S1807). If succeeded, a printing and transferring process of the searched image data is performed (step S1808). On the other hand, e.g., if the target image data has been deleted, it is judged that the searching failed, and an error process is performed (step S1809).

Figure 19:
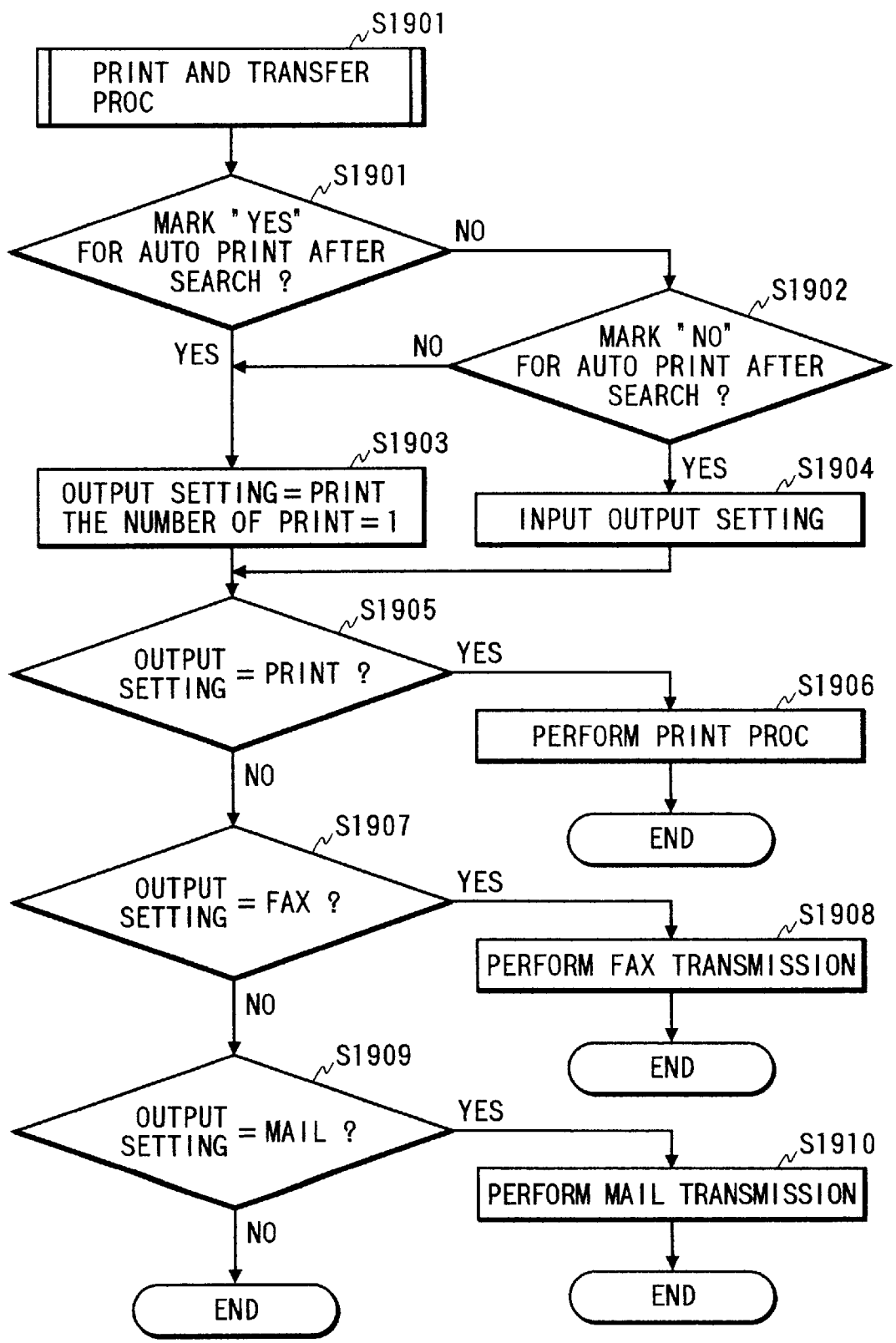
FIG. 19 is a flow chart showing the procedure of a process that the searched image data is output.

FIG. 19 is a flow chart showing the printing and transferring process (step S1808).

Initially, it is judged whether or not "YES" has been marked in the marking box 308 of the search sheet by using a pencil or the like to perform automatic printing after the searching (step S1901). If marked, the conditions "OUTPUT SETTING=PRINTING" and "THE NUMBER OF PRINTING=1" are set as output conditions of the searched image data.

If not marked in the marking box 308, it is further judged whether or not "NO" has been marked in the marking box 309 not to perform the automatic printing after the searching (step S1902). If marked, the console unit 115 performs the displaying for urging the operator to input the output setting. Then, in accordance with the operation by the operator, the output setting is input (step S1904). On the other hand, if not marked in neither the marking box 308 nor 309, the conditions "OUTPUT SETTING=PRINTING" and "THE NUMBER OF PRINTING=1" are set (step S1903).

In the step S1904 for inputting the output setting, it can be set from the console unit 115 either one of the conditions, i.e., the searched image is printed by the printer unit 2, the searched image is subjected to facsimile transmission, and the electronic mail is added with the searched image and then transmitted.

In the case where the output setting is made as the printing, the condition "OUTPUT SETTING=PRINTING" is set. In this case, the number of printing can be further set. On the other hand, in a case where the output setting is made as the facsimile transmission, the condition "OUTPUT SETTING=FAX" is set. In this case, also a telephone number of a communication partner is input. Further, in a case where the output setting is made as the electronic mail, the condition "OUTPUT SETTING=MAIL" is set. In this case, an electronic mail address of the communication partner is further input and a document for the electronic mail which has been previously stored is selected.

Subsequently, it is judged whether or not the output setting is "PRINTING" (step S1905). If "PRINTING", the printing process is performed in which the designated number of the printing of the searched image is performed by the printer unit 2 (step S1906), and then the process terminates.

Subsequently, it is judged whether or not the output setting is "FAX" (step S1907). If "FAX", the searched image is subjected to the facsimile transmission by the facsimile unit 4 via the telephone line (step S1908), and then the process terminates.

Subsequently, it is judged whether or not the output setting is "MAIL" (step S1909). If "MAIL", the searched image is appropriately compressed and then added to the document of the existing electronic mail, and the electronic mail transmission is performed to a destination at a desired address via the computer interface unit 7 (step S1910). After then, the process terminates.

Further, in the case where the searched image is transmitted by the electronic mail, if the searched image data is document data, such the image may be converted into a text by using an OCR (optical character reader), and such the obtained text may be inserted into the document of the electronic mail to be transmitted.

By performing the searching process as described above, the image data to be output can be easily output in the output form desired by the user.

Further, in the case where the user confirmed the image added to the search sheet and thus judged that the stored image data is unnecessary, such the image data can be deleted on the basis of the user's instruction.

It should be noted that the flow charts in FIGS. 6, 7, 9, 10, 12 to 15 and 17 to 19 respectively show the flows of the control which is performed by the CPU 114 on the basis of the program code stored in the memory 116 and the control which is performed by the CPU 123 on the basis of the program code stored in the memory 124. Further, if necessary, the CPUs 114 and 123 are communicated to each other, to control the operation. Furthermore, if necessary, the CPUs 114 and 123 are communicated to an another apparatus or the like, to control the operation.

The present invention can be applied to a system constructed by a plurality of equipments (e.g., host computer, interface equipment, reader, printer and the like) or can be also applied to an apparatus comprising a single equipment (e.g., copy machine, facsimile machine).

The invention employed by a method whereby program codes of a software to realize the functions of the foregoing embodiments are supplied to a computer in an apparatus or a system connected to various devices so as to make the devices operative in order to realize the functions of the foregoing embodiments and the various devices are operated in accordance with the programs stored in the computer (CPU or MPU) of the system or apparatus is also included in the scope of the present invention.

In such a case, the program codes themselves of the software realize the functions of the foregoing embodiments and the program codes themselves and means for supplying the program codes to the computer, e.g., a memory medium in which the program codes have been stored construct the present invention.

As such a memory medium to store the program codes, e.g., it is possible to use a floppy disk, a hard disk, an optical disk, an optomagnetic disk, a CD-ROM, a magnetic tape, a nonvolatile memory card, a ROM or the like can be used.

It will be obviously understood that the program codes are included in the embodiments of the present invention even in not only a case where the functions of the foregoing embodiments are realized by executing the supplied program codes by the computer but also a case where the functions of the foregoing embodiments are realized in cooperation with the OS (operating system) by which the program codes operate in the computer or another application software or the like.

Further, it will be also obviously understood that the present invention also incorporates a case where the supplied program codes are stored into a memory provided for a function expansion board of a computer or a function expansion unit connected to a computer and, after that, a CPU or the like provided for the function expansion board or the function expansion unit executes a part or all of the actual processes on the basis of instructions of the program codes, and the functions of the foregoing embodiments are realized by the processes.

Although the present invention has been described above with respect to the preferred embodiments, the present invention is not limited to the foregoing embodiments but many modifications and variations are possible with the spirit and scope of the appended claims.

What is claimed is:

1. A data communication apparatus comprising:

reception means for receiving data via a public network;

storing means for storing the data received by said reception means into a storage medium;

search sheet output means for outputting a search sheet to be used to search the data stored into the storage medium by said storing means;

input means for inputting the search sheet output by said search sheet output means;

output means for searching for and outputting the data which has been stored in the storage medium by said storing means; and control means for controlling at least said storing means, said search sheet output means and said output means such that the search sheet is outputted by said search sheet output means at a first time when the data is received by said reception means, the data thereafter remains stored in the storing medium until a second time when the search sheet is inputted by said input means, and the data is then outputted by said output means in response to input of the search sheet.

2. An apparatus according to claim 1, further comprising selection means for selecting either one of a first mode and a second mode, wherein, in the first mode, when the data is received by said reception means, all the reception data are not output, but are stored into the storage medium by said storing means, and the search sheet is output by said search sheet output means, and in the second mode, all the reception data are output by said output means, and wherein said control means controls processing of the reception data in accordance with a mode selected by said selecting means.

3. An apparatus according to claim 2, wherein said selection means selects the mode in accordance with a residual amount of recording paper used for printing the reception data by said output means.

4. An apparatus according to claim 1, further comprising addition means for adding at least a part of the reception data received by said reception means, to the search sheet to be output by said search sheet output means.

5. A data communication apparatus comprising:

input means for inputting data;

storing means for storing the data input by said input means into a storage medium;

output means for outputting search data to be used to search the data stored into the storage medium by said storing means;

transmission means for searching for the data stored into the storage medium by said storing means and for transmitting the searched-for data by using electronic mail; and control means for controlling at least said storing means, said output means and said transmission means such that, when the data is input by said input means, the search data is outputted by said output means, the data thereafter remains stored in the storage medium until a predetermined operation is performed, the data is then searched for in the storage medium in response to input of the search data, and the searched-for data is transmitted by using the electronic mail.

6. An apparatus according to claim 5, wherein said output means outputs a search sheet which bears information to be used for searching for the data stored into the storage medium by said storage means.

7. An apparatus according to claim 6, wherein the search sheet bears a visible image representing at least a part of the data stored into the storage medium by said storage means.

8. An apparatus according to claim 5, wherein said transmission means transmits to a desired destination the electronic mail added with the searched-for data, based on a setting by an operator.

9. A computer readable program stored in a storage medium, comprising:

a reception step of receiving data via a public network;

a storing step of storing the data received in said reception step into a storage medium;

a search sheet output step of outputting a search sheet to be used to search the data stored into the storage medium in said storing step;

an input step of inputting the search sheet output in said search sheet output step;

an output step of searching for and outputting the data which has been stored in the storage medium in said storing step; and a control step controlling at least said storing step, said search sheet output step and said output step such that the search sheet is outputted by said search sheet output step at a first time when the data is received by said reception step, the data thereafter remains stored in the storing medium until a second time when the search sheet is inputted by said input means, and the data is then outputted in said output step in response to input of the search sheet.

10. A computer readable program stored in a storage medium, comprising:

an input step of inputting data;

a storing step of storing the data input in said input step into a storage medium;

an output step of outputting search data to be used to search the data stored into the storage medium in said storing step;

an transmission step of searching for the data stored into the storage medium in said storing step and for transmitting the searched-for data by using electronic mail; and a control step of controlling at least said storing step, said output step and said transmission step such that, when the data is input by said input step, the search data is outputted by said output step, the data thereafter remains stored in the storage medium until a predetermined operation is performed, the data is then searched for in the storage medium in response to input of the search data, and the searched-for data is transmitted by using the electronic mail.

11. A data communication method comprising the steps of:

receiving data via a public network;

storing the data received at said reception step into a storage medium;

outputting a search sheet to be used to search the data stored into the storage medium in said storing step;

inputting the search sheet output at said search sheet output step;

searching for and outputting the data which has been stored in the storage medium in said storing step; and controlling at least said storing step, said search sheet output step and said searching/outputting step such that the search sheet is outputted in said search sheet output step at a first time when the data is received in said reception step, the data thereafter remains stored in the storing medium until a second time when the search sheet is inputted at said input step, and the data is then outputted by said searching/outputting step in response to input of the search sheet.

12. A data communication method comprising the steps of:

inputting data;

storing the data input in said input step into a storage medium;

output means for outputting search data to be used to search the data stored into the storage medium in said storing step;

searching for the data stored into the storage medium in said storing step and transmitting the searched-for data by using electronic mail; and controlling at least said storing step, said output step and said searching/transmission step such that, when the data is input at said input step, the search data is outputted in said output step, the data thereafter remains stored in the storage medium until a predetermined operation is performed, the data is then searched for in the storage medium in response to input of the search data, and the searched-for data is transmitted by using the electronic mail.

* * * * *

UNITED STATES PATENT AND TRADEMARK OFFICE
CERTIFICATE OF CORRECTION

PATENT NO. : 5,905,783
DATED       : May 18, 1999
INVENTOR(S) : NOBUYUKI TONEGAWA

It is certified that error appears in the above-identified patent and that said Letters Patent is hereby corrected as shown below:

<u>IN THE DRAWINGS</u>

Sheet 5, FIG. 5, "SEAT" (both occurrences) should read --SHEET--.

<u>COLUMN 12</u>

Line 34, "or" should read --or not--.

<u>COLUMN 18</u>

Line 52, "an" should read --a--.

Signed and Sealed this

Twenty-eighth Day of December, 1999

Attest:

Q. TODD DICKINSON

*Attesting Officer*    *Acting Commissioner of Patents and Trademarks*